US012352684B2

(12) United States Patent
Caliendo et al.

(10) Patent No.: US 12,352,684 B2
(45) Date of Patent: Jul. 8, 2025

(54) DAMPER TORQUE OR VALVE FORCE TESTING DEVICE

(71) Applicant: Siemens Industry, Inc., Alpharetta, GA (US)

(72) Inventors: Guy P. Caliendo, Algonquin, IL (US); Gary Eiklor, Elgin, IL (US); Dean B. Anderson, Wonder Lake, IL (US); Marco Marder, Ebikon (CH)

(73) Assignee: Siemens Industry, Inc., Alpharetta, GA (US)

( * ) Notice: Subject to any disclaimer, the term of this patent is extended or adjusted under 35 U.S.C. 154(b) by 811 days.

(21) Appl. No.: 17/411,311

(22) Filed: Aug. 25, 2021

(65) Prior Publication Data

US 2023/0061984 A1 Mar. 2, 2023

(51) Int. Cl.
| | |
|---|---|
| *G01N 19/00* | (2006.01) |
| *B60H 1/00* | (2006.01) |
| *G01L 3/00* | (2006.01) |
| *G01L 5/00* | (2006.01) |
| *G01M 13/003* | (2019.01) |

(52) U.S. Cl.
CPC ......... *G01N 19/00* (2013.01); *B60H 1/00835* (2013.01); *B60H 1/00857* (2013.01); *G01L 3/00* (2013.01); *G01L 5/0042* (2013.01); *G01M 13/003* (2019.01)

(58) Field of Classification Search
CPC ........... B60H 1/00835; B60H 1/00857; G01M 13/003; G01L 5/0042; G01L 3/00; G01L 5/26; G01N 19/00
See application file for complete search history.

(56) References Cited

U.S. PATENT DOCUMENTS

| | | | | |
|---|---|---|---|---|
| 3,737,747 A | * | 6/1973 | Krauer | H02P 25/024 |
| | | | | 318/717 |
| 5,373,987 A | * | 12/1994 | Corabatir | F24F 11/75 |
| | | | | 74/89.41 |
| 2007/0087681 A1 | | 4/2007 | Cook et al. | |

(Continued)

OTHER PUBLICATIONS

Bikic Sinisa et al: "Air torque position damper hysteresis", Flow Measurement and Instrumentation, Butterworth-Heinemann, Oxford, GB, vol. 71, Jan. 7, 2020 (Jan. 7, 2020), XP086069941, ISSN: 0955-5986, DOI: 10.1016/J.FLOWMEASINST.2019.101688 (retrieved on Jan. 7, 2020) the whole document.

*Primary Examiner* — Paul M. West

(57) ABSTRACT

A testing device characterizes a damper/valve in situ in a HVAC system. It comprises a controller including a processor and a memory and circuitry. The testing device is mounted on a damper assembly having a control shaft and a damper rotatably coupled to the control shaft such that the control shaft is activated by the circuitry of the testing device. The testing device further comprises computer-readable logic code to: open and close the damper by actuating the control shaft, detect a rotational position of the damper and a torque required to move the damper to the rotational position, characterize a plurality of torques required to drive the damper to a plurality of pre-determined rotational positions of the damper when subjected to a fluid flow to generate damper rotational position data vs. torque data, and store the damper rotational position data vs. torque data to produce damper characteristic graphs.

23 Claims, 12 Drawing Sheets

(56) References Cited

U.S. PATENT DOCUMENTS

2008/0084173 A1     4/2008   Grabinger et al.
2016/0156299 A1*   6/2016   Romanowich .......... H02P 29/40
                                                                          318/400.21
2017/0293293 A1* 10/2017   Brownie ............ G05B 23/0243

* cited by examiner

FIG. 9

Damper Torque Curves (1)

Maximum Torque Witnessed (No Airflow) = ~42 lb-in

All testing conducted with the actuator/mounting apparatus not a part of the damper assembly 12x12 Torque Factor = 42 lb-in/sq.ft.

Blade Seals = 2 linear feet 26 lb-in/linear ft.

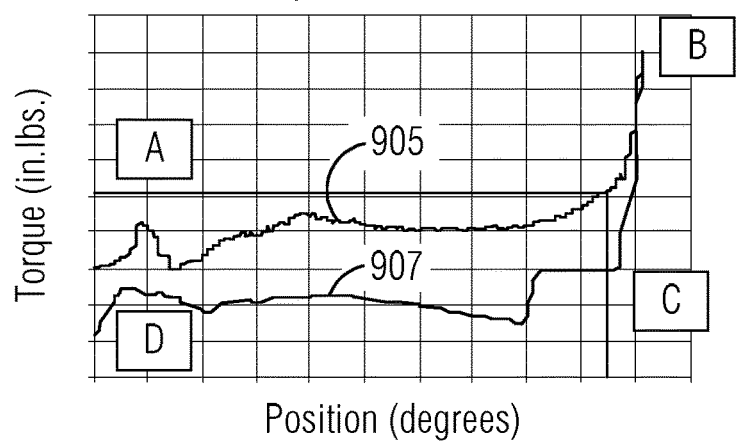

12x12 (GJD) Damper A: Torque vs. Position Drive Open/Power Fail Closed

Damper Torque Curves (2)

Maximum Torque Witnessed (No Airflow) = ~93 lb-in

All testing conducted with the actuator/mounting apparatus not a part of the damper assembly 36x36 Torque Factor = 10.33 lb-in/sq.ft.

Blade Seals = 6 linear feet 16 lb-in/linear ft.

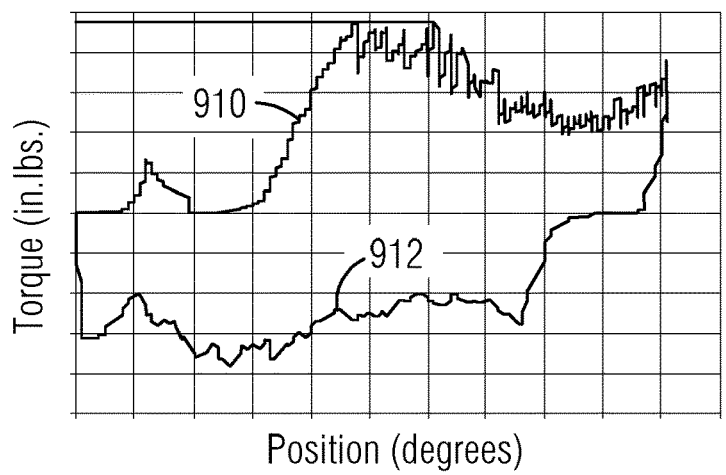

36x36 (GKD) Damper B2: Torque vs. Position Drive Open/Power Fail Closed

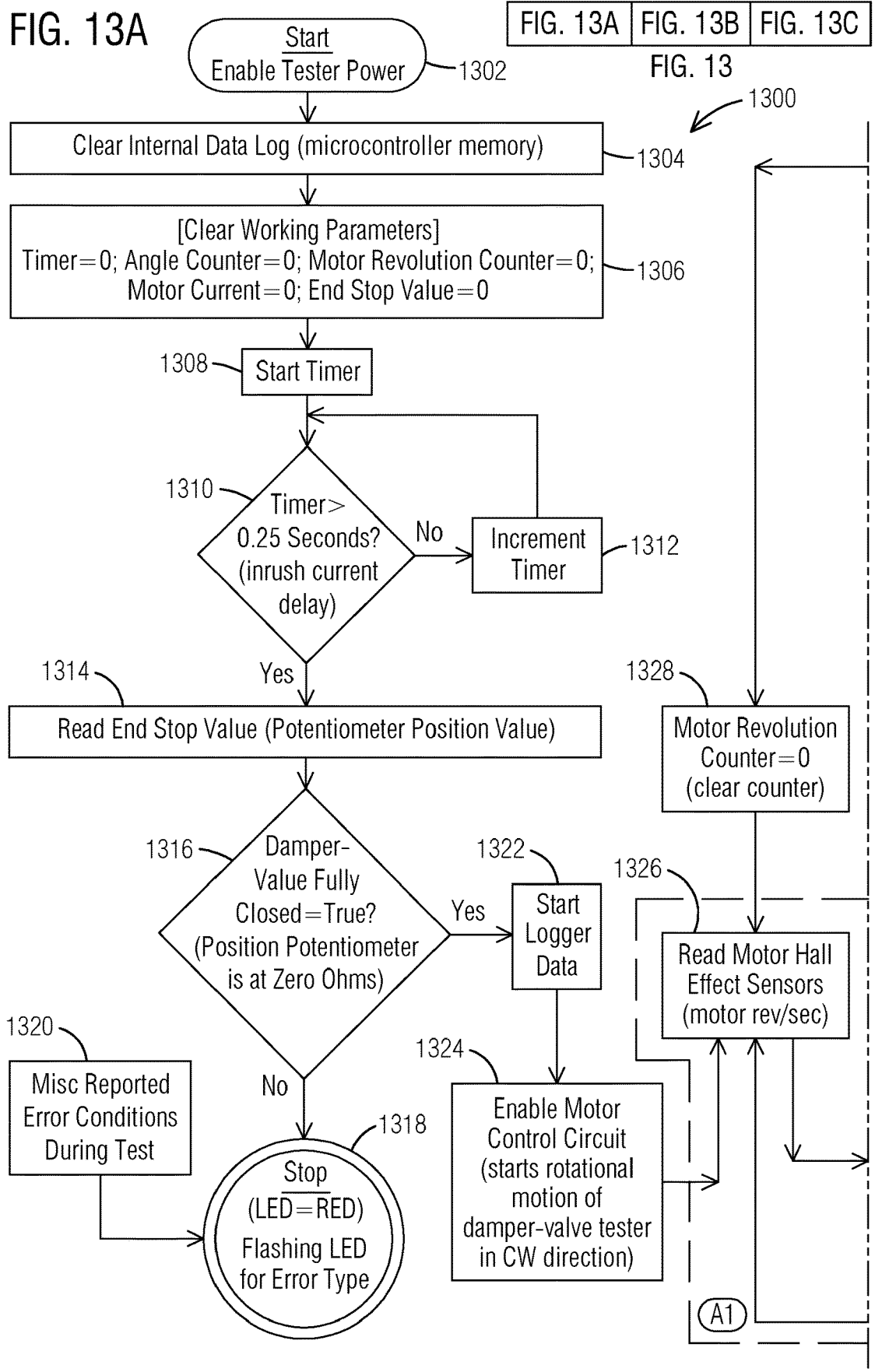

DAMPER TORQUE OR VALVE FORCE TESTING DEVICE

BACKGROUND

1. Field

Aspects of the present invention generally relate to a testing device configured to measure and characterize the amount of torque or force that is required to fully open and close both air damper and liquid valve control assemblies during their normal range of operation.

2. Description of the Related Art

A damper is a valve, blade(s) or plate within a damper assembly that stops or regulates the flow of fluid (e.g., air) inside a duct, chimney, VAV box, air handler, or other air-handling equipment, or within a pipe where the fluid is typically water. Accurate damper rotational position versus torque data for different damper assemblies is not readily available for customers (such as damper assembly manufacturers, building owners, or HVAC system contractors) who purchase damper actuators for their damper assemblies. If actuator customers do not know or understand the torque required to drive their dampers, they may purchase the wrong actuator or fail expensive qualification testing giving the perception that they were sold a defective product.

The damper manufacturer customers that purchase actuators do not always have the technology to characterize the torque required vs. rotational position of their damper when installed in an HVAC duct system and subjected to air flow. Because they don't have this ability, they sometimes find actuators as too weak or they order actuators that are too big or too small for their specific HVAC duct system application or they think the actuators are defective when in reality it may be that their dampers were assembled or designed incorrectly. Damper manufacturer customers often ask damper actuator suppliers (such as Siemens Industry, Inc.) to come to their facilities with lab instrumentation to characterize their dampers for them. Some other damper customers often ship damper assemblies to damper actuator suppliers to characterize without air flow in a lab. All this damper testing is expensive and time consuming. Such expensive and time consuming in-person testing visit with transportation of lab testing equipment is a problem for selecting the optimal damper actuator for driving a particular damper or valve assembly.

Therefore, there is a need for an apparatus and method for testing a damper assembly or a valve for actuator selection and/or damper or valve malfunction identification.

SUMMARY

Briefly described, aspects of the present invention relate to a testing device configured to measure and characterize the amount of torque or force that is required to fully open and close both air damper and liquid valve control assemblies during their normal range of operation. This testing device can be used by damper manufacturers or actuator suppliers to select the optimal damper actuator for a particular damper or valve assembly. There is no need for an expensive and time consuming in-person testing visit with transportation of lab testing equipment. This testing device is relatively compact and can be mounted and used by damper manufacturer customers themselves. This testing device looks and acts like a non-spring return actuator but serves a different purpose. This testing device opens and closes a damper like a normal actuator but outputs rotational position and the torque required to move the damper to that position. The testing device may store all of the test result data on a SD card or some other data storage device that the damper manufacturer customer may download to produce corresponding damper characteristic graphs for selection of the optimal damper actuator for the tested damper . . . assembly. In another embodiment, the testing device may have a wireless interface to transmit the test result data to a remote computer system for producing damper characteristic graphs and selection of the optimal damper actuator for the tested damper assembly. In yet another embodiment, the testing device may determine the optimal damper actuator for the tested damper assembly using damper characteristics derived from the test result data in comparison to a performance characteristics database of commercially available actuators, and then outputting the optimal damper actuator selection.

In accordance with one illustrative embodiment of the present invention, a testing device is provided to characterize a damper in situ in a heating, ventilation and air conditioning (HVAC) system. The testing device comprises a controller including a processor and a memory and circuitry. The testing device is configured to be mounted on a damper assembly having a control shaft and a damper rotatably coupled to the control shaft such that the control shaft is activated by the circuitry of the testing device. The testing device further comprises computer-readable logic code stored in the memory which, when executed by the processor, causes the controller to: open and close the damper by actuating the control shaft, detect a rotational position of the damper and a torque required to move the damper to the rotational position, characterize a plurality of torques required to drive the damper to a plurality of pre-determined rotational positions of the damper when subjected to a fluid flow to generate damper rotational position data vs. torque data, and store the damper rotational position data vs. torque data on a data storage device that a damper manufacturer customer may download to produce damper characteristic graphs for selection of the optimal damper actuator for the tested damper assembly.

In accordance with one illustrative embodiment of the present invention, a method of characterizing a torque required vs. a rotational position of a damper with a testing device is provided. The method comprises providing a controller including a processor and a memory for characterizing the damper in situ in a heating, ventilation and air conditioning (HVAC) system and providing circuitry. The testing device is configured to be mounted on a damper assembly having a control shaft and a damper rotatably coupled to the control shaft such that the control shaft is activated by the circuitry of the testing device. The method further comprises providing computer-readable logic code stored in the memory which, when executed by the processor, causes the controller to: open and close the damper by actuating the control shaft, detect a rotational position of the damper and a torque required to move the damper to the rotational position, characterize a plurality of torques required to drive the damper to a plurality of pre-determined rotational positions of the damper when subjected to a fluid flow to generate damper rotational position data vs. torque data, and store the damper rotational position data vs. torque data on a data storage device that a damper manufacturer customer may download to produce corresponding damper characteristic graphs for selection of the optimal damper actuator for the tested damper assembly.

In accordance with one illustrative embodiment of the present invention, a testing device is provided to characterize a linear stroke valve in situ in a heating, ventilation and air conditioning (HVAC) system. The testing device comprises a controller including a processor and a memory and circuitry. The testing device is configured to be mounted on a linear stroke valve assembly having a control shaft and a linear stroke valve coupled to the control shaft such that the control shaft is activated by the circuitry of the testing device. The testing device further comprises computer-readable logic code stored in the memory which, when executed by the processor, causes the controller to: open and close the linear stroke valve by actuating the control shaft, detect a linear position of the valve and a force required to move the linear stroke valve to the linear position, characterize a plurality of forces required to drive the linear stroke valve to a plurality of pre-determined linear positions of the linear stroke valve when subjected to a fluid flow to generate valve linear position data vs. force data and store the valve linear position data vs. force data on a data storage device that a customer may download to produce linear stroke valve characteristic graphs for selection of the optimal actuator for the tested valve assembly.

BRIEF DESCRIPTION OF THE DRAWINGS

FIG. 9 illustrates sample torque curves on customer dampers generated using a testing device in accordance with an exemplary embodiment of the present invention.

FIG. 13 is broken into three sub-figures namely FIG. 13A, FIG. 13B and FIG. 13C.

DETAILED DESCRIPTION

Figure 1:
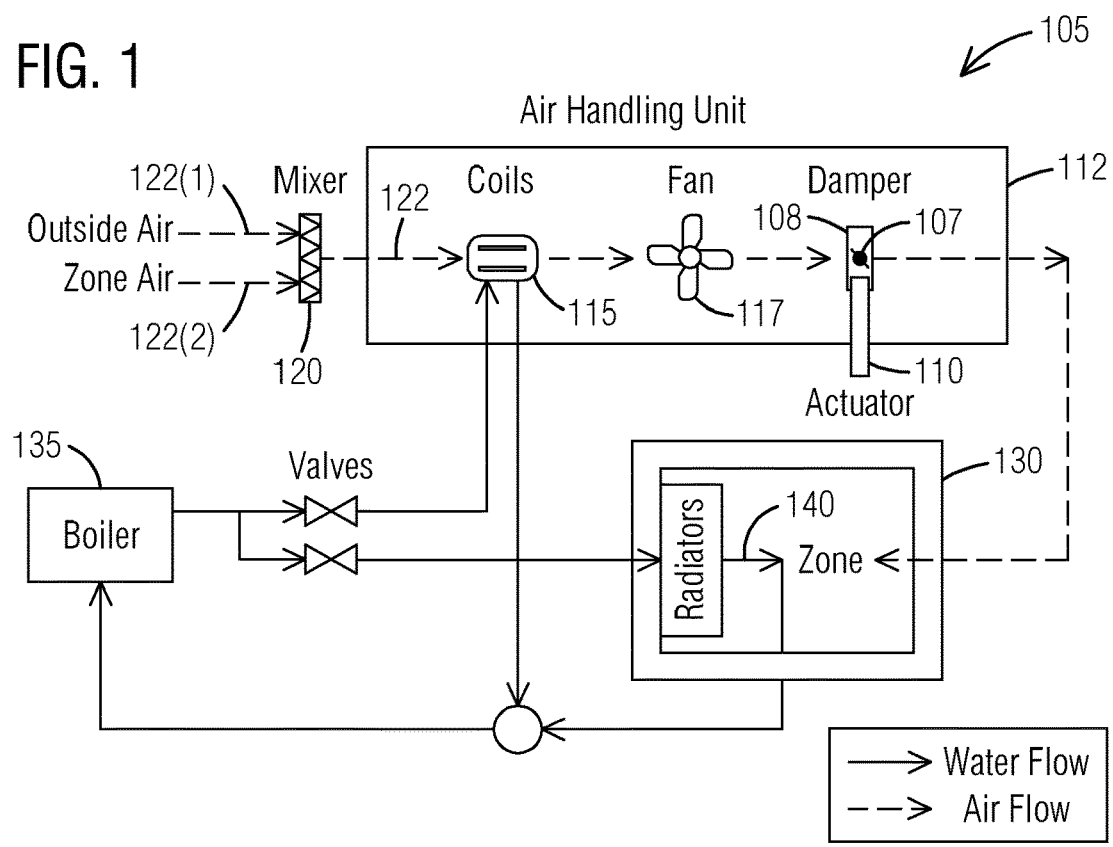
FIG. 1 illustrates a schematic of a damper in situ in a heating, ventilation and air conditioning (HVAC) system for characterization by a testing device in accordance with an exemplary embodiment of the present invention.

To facilitate an understanding of embodiments, principles, and features of the present invention, they are explained hereinafter with reference to implementation in illustrative embodiments. In particular, they are described in the context of a testing device configured to measure and characterize the amount of torque or force that is required to fully open and close both air damper and liquid valve control assemblies during their normal range of operation. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

These and other embodiments of the testing device according to the present disclosure are described below with reference to FIGS. 1-12 herein. Like reference numerals used in the drawings identify similar or identical elements throughout the several views. The drawings are not necessarily drawn to scale.

Consistent with one embodiment of the present invention, FIG. 1 represents a block diagram of a heating, ventilation and air conditioning (HVAC) system 105 installed in a building in accordance with an exemplary embodiment of the present invention. A damper assembly 108 having a damper 107 is provided in situ in the HVAC system 105 for characterization by a testing device 110 mounted to the damper assembly 108 in accordance with an exemplary embodiment of the present invention. The testing device 110 may employ an actuator configured as further described herein.

The HVAC system 105 includes an air handling unit 112 which comprises coils 115 and a fan 117 being provided in front of the damper 107. The HVAC system 105 further includes a mixer 120 which mixes an outside air 122(1) with a zone air 122(2). The mixed air 122 passes through the coils 115 and goes to the fan 117 to be distributed via the damper 107 when rotated to a partial or fully open position. The air flows from the damper assembly, when the damper 107 is opened, through a duct system to a zone 130 within the building (the duct system is represented in FIG. 1 by the dashed arrows exiting the damper assembly 108 and entering the zone 130). Water flows via the coils 115 which is served by a boiler 135 to heat up the water. In this way, a water flow 140 is channeled through the zone 130.

Figure 2:
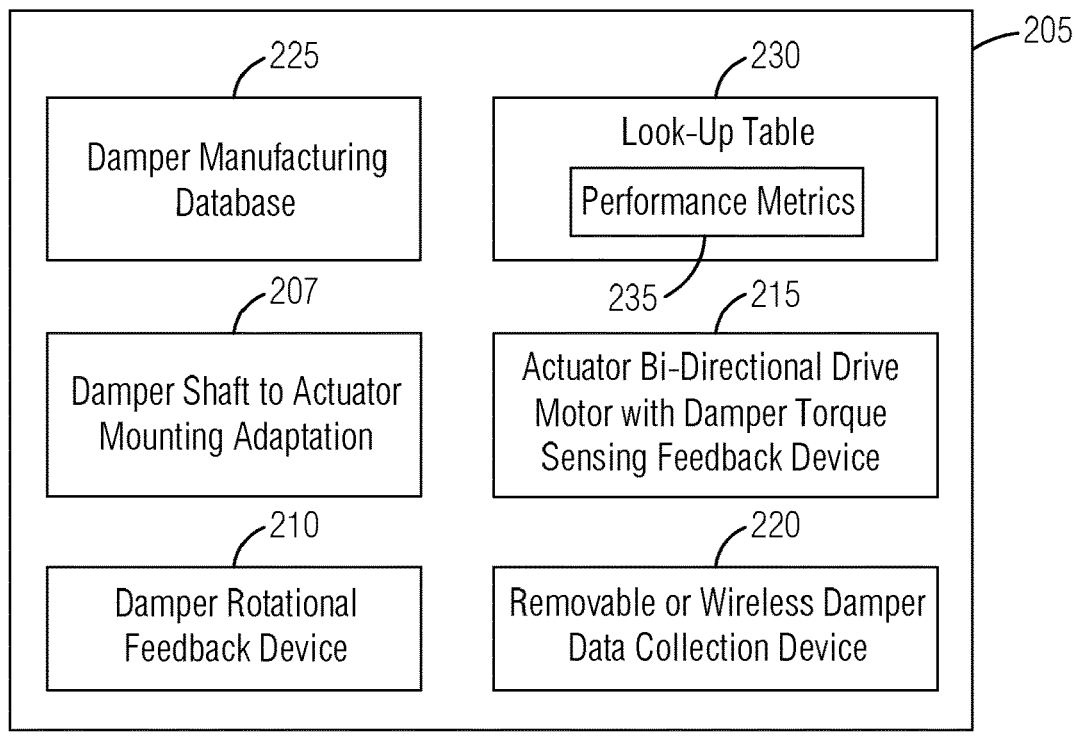
FIG. 2 illustrates a schematic of a damper torque vs. rotation sensing device in accordance with an exemplary embodiment of the present invention.

Referring to FIG. 2, it illustrates a schematic of a damper torque vs. rotation sensing device 205 (e.g., the testing device 110 of FIG. 1) in accordance with an exemplary embodiment of the present invention. The damper torque vs. rotation sensing device 205 further comprises a damper shaft to actuator mounting adaptation 207 that represents coupling or attachment means of the damper torque vs. rotation sensing device 205 to a control shaft of the damper assembly 108 that is coupled to the damper 107 (see FIG. 1) being tested.

The damper torque vs. rotation sensing device 205 further comprises a damper rotational feedback device 210 that represents a rotational measurement component facilitating an output of a position of the damper 107 being tested. The damper torque vs. rotation sensing device 205 further comprises an actuator bi-directional drive motor with damper torque sensing feedback device 215 which is an actuator that represents a bi-directional drive motor that can drive the damper 107 in either an open or close direction while outputting information about the torque of the damper 107 at any given rotational position. The damper torque vs. rotation sensing device 205 further comprises a removable or wireless damper data collection device 220 that represents an on-board data acquisition device that can record and output rotation and torque information of the damper: being tested. The damper torque vs. rotation sensing device 205 further comprises a damper manufacturing database 225 and a look-up table 230 including performance metrics 235. The damper manufacturing database 225 may be a database of commercially available damper actuators and the look-up table 230 has performance metrics 235 for each of the available damper actuators identified in the database 225 such that the testing device 110, 205 can obtain the torque vs. rotational position test results for the damper 107 under test as described herein, then use those test results to identify similar performance metrics in the look-up table 230 to identify an optimal damper actuator available from the commercially available damper actuators identified in the database 225.

Figure 3:
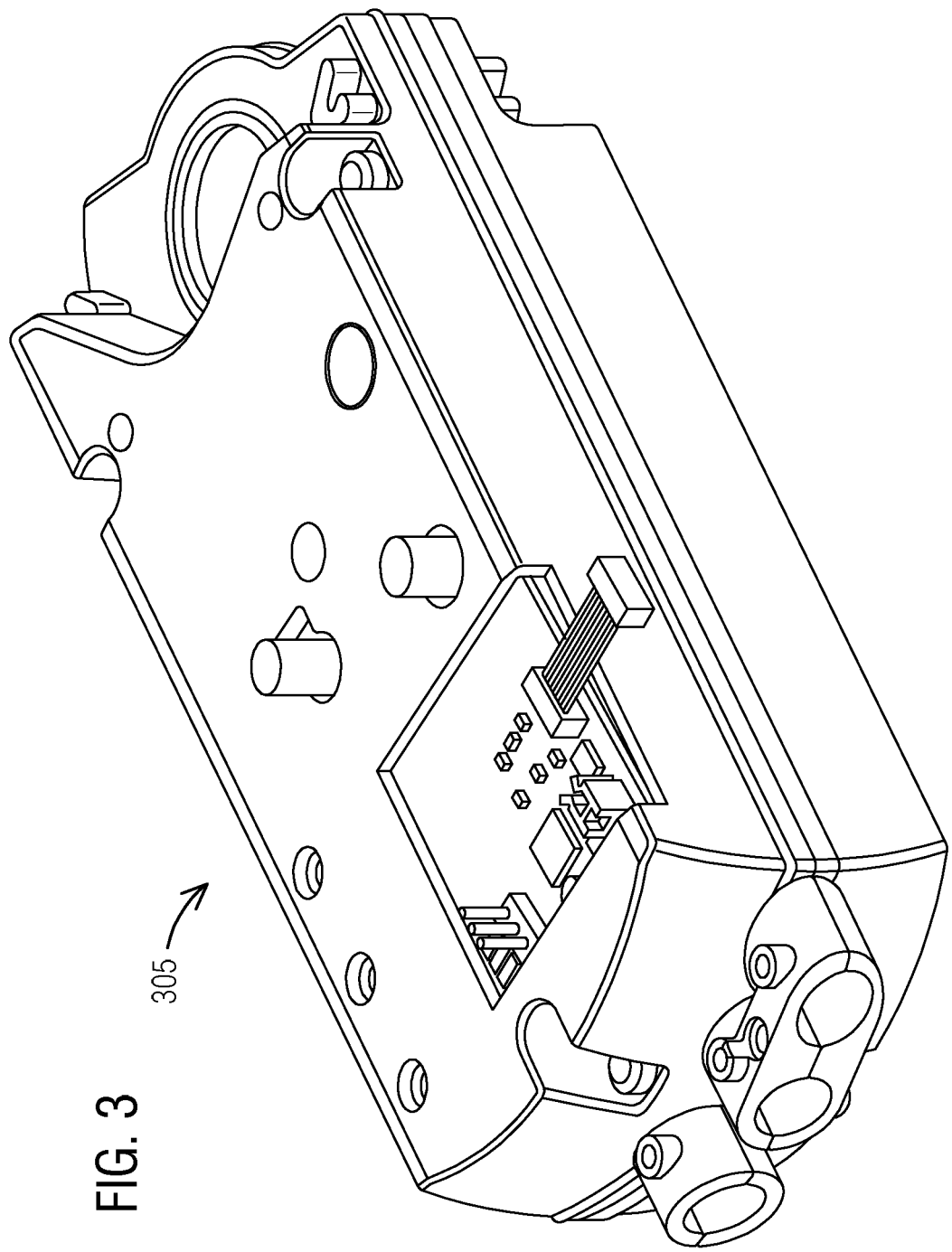
FIG. 3 illustrates a perspective view of a torque testing device in accordance with an exemplary embodiment of the present invention.
Figure 4:
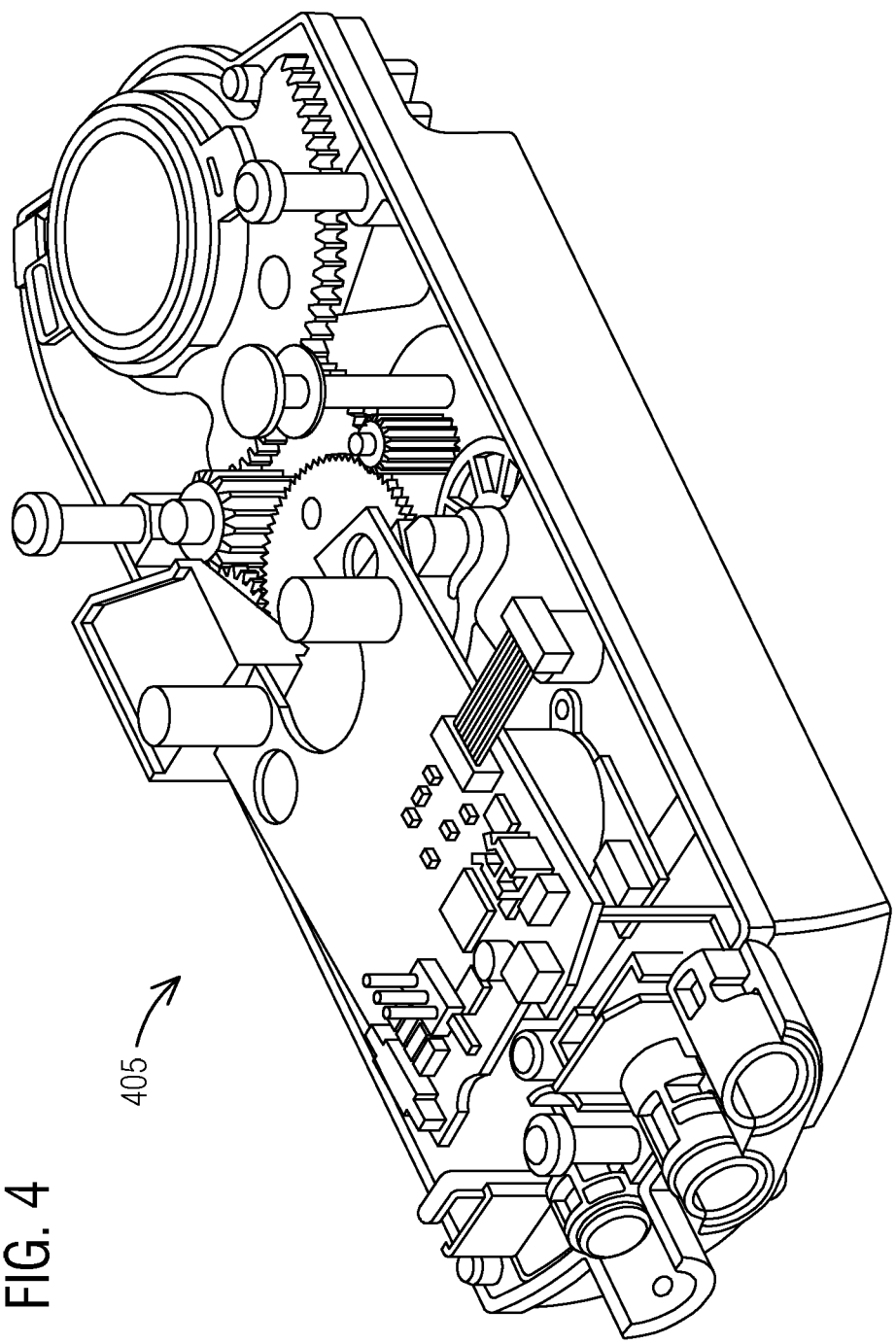
FIG. 4 illustrates a perspective view of the torque testing device in FIG. 3 with its cover removed.

Turning now to FIG. 3, it illustrates a perspective view of a torque testing device 305 in accordance with an exemplary embodiment of the present invention with its cover installed. FIG. 4 illustrates a perspective view of the torque testing device 405 with its cover removed. As shown in FIGS. 3 and 4, the torque testing device 305/405 may be based on a damper actuator (such as commercially available from Siemens Industry, Inc.) adapted to include the components of the damper torque vs. rotation sensing device 205 illustrated in FIG. 2 and/or other testing devices further described in reference to other embodiments herein.

Figure 5:
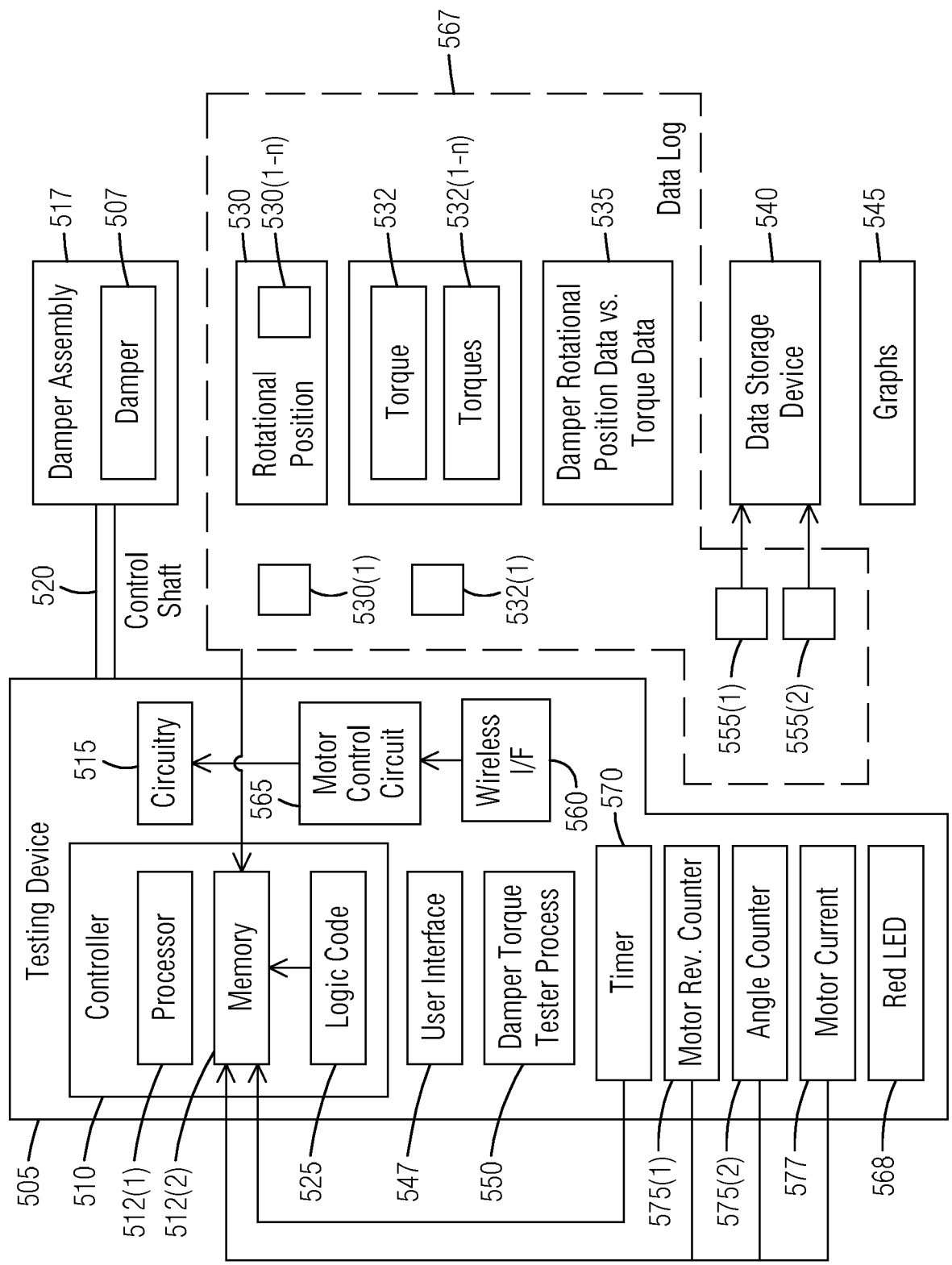
FIG. 5 illustrates a schematic of a testing device in accordance with an exemplary embodiment of the present invention.

As seen in FIG. 5, it illustrates a schematic of a testing device 505 in accordance with an exemplary embodiment of the present invention. The testing device 505 is configured to characterize a damper 507 in situ in a heating, ventilation and air conditioning (HVAC) system. The testing device 505 comprises a controller 510 (also referenced herein as a "microcontroller") that includes a processor 512(1) and a memory 512(2). The testing device 505 further comprises circuitry 515. The testing device 505 is configured to be mounted on a damper assembly 517 having a control shaft 520 and the damper 507 rotatably coupled to the control shaft 520 such that the control shaft 520 is activated by the circuitry 515 of the testing device 505. The testing device 505 may employ components consistent with those of the testing device 205 such as the "Damper Shaft to Actuator Mounting Adaptation" 207 that enables coupling to the control shaft 520 of the damper assembly.

The testing device 505 further comprises computer-readable logic code 525 stored in the memory 512(2) which, when executed by the processor 512(1), causes the controller 510 to open and close the damper 507 by actuating the control shaft 520 and detect a rotational position 530 of the damper 507 and a torque 532 required to move the damper 507 to the rotational position 530. As further described in detail herein, the controller 510 further characterizes a plurality of torques 532(1-n) required to drive the damper 507 to a plurality of pre-determined rotational positions 530(1-n) of the damper 507 when subjected to a fluid flow to generate damper rotational position data vs. torque data 535, may be part of test results data of the testing device. The controller 510 further stores the damper rotational position data vs. torque data 535 on a data storage device 540 that may be downloaded by a technician, damper manufacturer customer or other user having reviewed the present invention as disclosed herein to produce damper characteristic graphs 545 for selection of the optimal damper actuator for the tested damper assembly.

In another embodiment, the testing device 505 may have a wireless interface 560 to transmit the test result data to a remote computer system for producing damper characteristic graphs and selection of the optimal damper actuator for the tested damper assembly. In yet another embodiment, the testing device may determine the optimal damper actuator for the tested damper assembly using damper characteristics derived from the test result data in comparison to a performance characteristics database of commercially available actuators, and then outputting the optimal damper actuator selection.

In one embodiment, the testing device 505 further comprises a motor (such as actuator bi-directional drive motor 215) and a motor control circuit 565 that is coupled to the motor and to the circuitry 515 for controlling the actuation (i.e., the angular or linear rotation) of the control shaft 520 of the damper assembly via the controller 510. The testing device may also include a data log 567 and an external indicator that may include a red LED 568 to reflect an error condition detected by the testing device 505 and a green LED to reflect a successful completion of the process 1300 by the testing device 505. As described in further detail herein, the data log 567 may include rotational position data and torque data that is detected by the testing device 505 and stored in the volatile or erasable portion of memory 512(2). In one embodiment, the testing device 505 further comprises a timer 570, a motor revolution counter 575(1), and an angle counter 575(2) that corresponds to the current rotational position or angle of the damper within the damper assembly under test by the testing device 505. The testing device 505 also measures and stores a motor current value 577 in memory in accordance with the test process describe herein to derive or characterize a torque required to move the damper under test to a commanded rotational position.

The testing device 505 further comprises a user interface 547 that enables a user to input settings and receive output. For example, the controller 510 may deploy the user interface 547 to enable the user to interactively control a damper torque tester process 550 performed by the testing device 505 such as the process 1300 described herein.

The controller 510 is configured to test damper rotational position vs. torque for the damper assembly 517. The controller 510 operates the damper 507 to a first . . . commanded rotational position 530(1) to measure a first torque 532(1) required to achieve the first commanded rotational position 530(1). When the first commanded rotational position 530(1) is reached, the controller 510 checks (via the damper rotational feedback device 210 such as a potentiometer as further described herein) if the damper 507 valve is fully closed (e.g., 0 degrees opening) or fully open (e.g., 90 degrees opening), depending on the direction of rotation.

The controller 510 records each commanded rotational position 530(1-n) (collectively referenced as rotational position data 555(2)) in association with the corresponding measured torque 532(1-n) required to drive the damper 507 to the respective commanded rotational position (collectively referenced as torque data 555(1)) on the data storage device 540. The controller 510 is also enabled to read the torque data 555(1) and the rotational position data 555(2) and cross reference to a catalogue of actuators (which may be stored locally in database 225) to determine an optimal actuator having performance metrics 235 that meet the damper characteristics depicted by the torque data . . . 555(1) and rotational position data 555(2) generated for the respective damper 507 by the testing device 505. In one embodiment, the controller 510 is able to determine the optimal actuator as one that has sufficient power to meet but not significantly exceed the torque 532 required to drive the damper 507 to the respective commanded position. By obtaining the damper rotational position data vs. torque data for a damper under test, the testing device 505 is able to identify an optimal actuator that is not too weak or too small to drive the damper under test and not too strong or too big that would be inefficient to use for the damper under test. The testing device 505 may display the identification of the optimal actuator on the user interface 547 or communicate the identification of the optimal actuator via a wireless interface to a computer or mobile device of a user.

The controller 510 may also transmit, via the wireless interface 560, the torque data 555(1) and the rotational position data 555(2) to a computer that stores other actuator catalogues with corresponding performance metrics data to find out if another available actuator would work to drive the tested damper.

Figure 6:
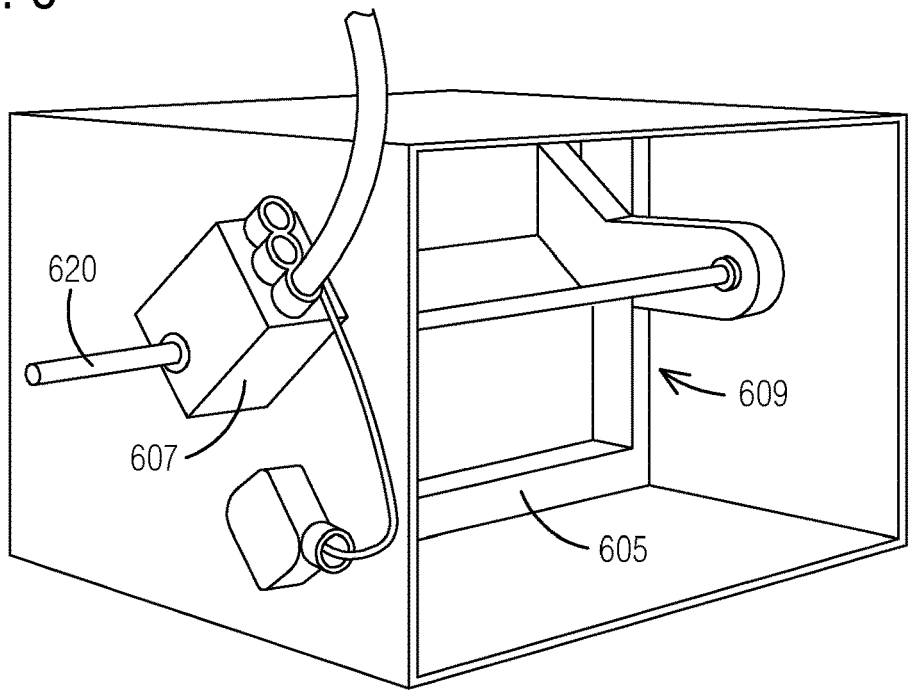
FIG. 6 illustrates one type of damper and an actuator adapted to be a testing device in accordance with an exemplary embodiment of the present invention.

As shown in FIG. 6, it illustrates one type of a damper 605 and an actuator 607 adapted to be a testing device in accordance with an exemplary embodiment of the present invention. The testing device actuator 607 is based on a damper actuator (such as commercially available from Siemens Industry, Inc.) and adapted to include the components of the testing device 505. The actuator 607 is configured to be mounted on a damper assembly 609 having a control shaft 620 and the damper 605 rotatably coupled to the control shaft 620 such that the control shaft 620 is activated by a circuitry of the actuator 607.

The actuator 607 may comprise an electric motor for positioning of the damper 605 in a HVAC system. For example, the actuator 607 may be a two-position actuator that may be a spring return or a non-spring return direct coupled actuator. The actuator 607 uses a form of power to convert a control signal or command (such as a commanded damper position) into mechanical motion (such as the actuator motion to apply torque to the control shaft of the damper assembly to move the damper to the commanded damper position). The actuator 607 is a part of the HVAC system that helps it to achieve physical movements by converting energy, often electrical, air, or hydraulic, into mechanical force.

The actuator 607 when coupled to the control shaft 620 of the damper assembly controls the damper 605. The damper 605 is a valve, blade(s) or a plate that stops or regulates a flow of fluid (e.g., air) inside a duct, chimney, VAV box, air handler, or other air-handling equipment. The damper 605 may be used to cut off central air conditioning (heating or cooling) to an unused room, or to regulate it for room-by-room temperature and climate control. By utilizing a low voltage signal, the actuator 607 places the damper 605 at any point between fully open and fully closed. The actuator 607 ensures that zone dampers function properly-without them, the dampers won't function at all. Dampers are almost always within 2-6 feet of the main trunk such as the portion of the ductwork represented by the Air Handling Unit 112 of the HVAC System 105 in FIG. 1. The dampers might be located right off the main trunk or a few feet away or they might even be rectangular. A HVAC damper (also called a duct damper) regulates airflow and redirects it to specific areas of the home or building. Dampers are typically used in zoning or "zone control" systems. Types of dampers in HVAC include a butterfly flat dish damper, a blade damper, a guillotine damper, a louver damper and an inlet vane damper.

The actuator 607 may be a linear actuator. Linear actuators are devices that produce movement within a straight path. The basic working principle of electric linear actuators is to convert the rotary motion into a linear motion. This conversion of motion is done with the help of a gearbox and a lead screw. These are the two most important electric linear actuator parts.

The actuator 607 may be a rotary actuator. Actuators are segregated by motion and power source. Linear actuators produce push/pull action. Rotary actuators produce rotational motion. In many cases, linear actuators begin with a rotary prime mover-a motor, typically-whose rotation is converted to linear motion through a power screw or similar device.

To size a damper actuator, a simple formula of Width X Height divided by 144 will give the square footage of a damper. For example, if the damper in question is 45 inches×23 inches using the formula. 45×23=1035 divided by 144=7.1875 square feet of damper area.

Dynamic torque can be calculated from the formula $T_d = C(\Delta P)$. Here, $\Delta P$ is the effective pressure drop across the damper or valve at a given temperature and C is, once again, a constant. To calculate an actuator torque, note a force about a given axis that produces rotation has a moment (torque, T). The magnitude of the moment is the product of the force (F) and the perpendicular distance (D) from the line of action of the force to the axis, $T = F \times D$. Simply put torque is generated by a twisting force which produces rotation about an axis.

Figure 7:
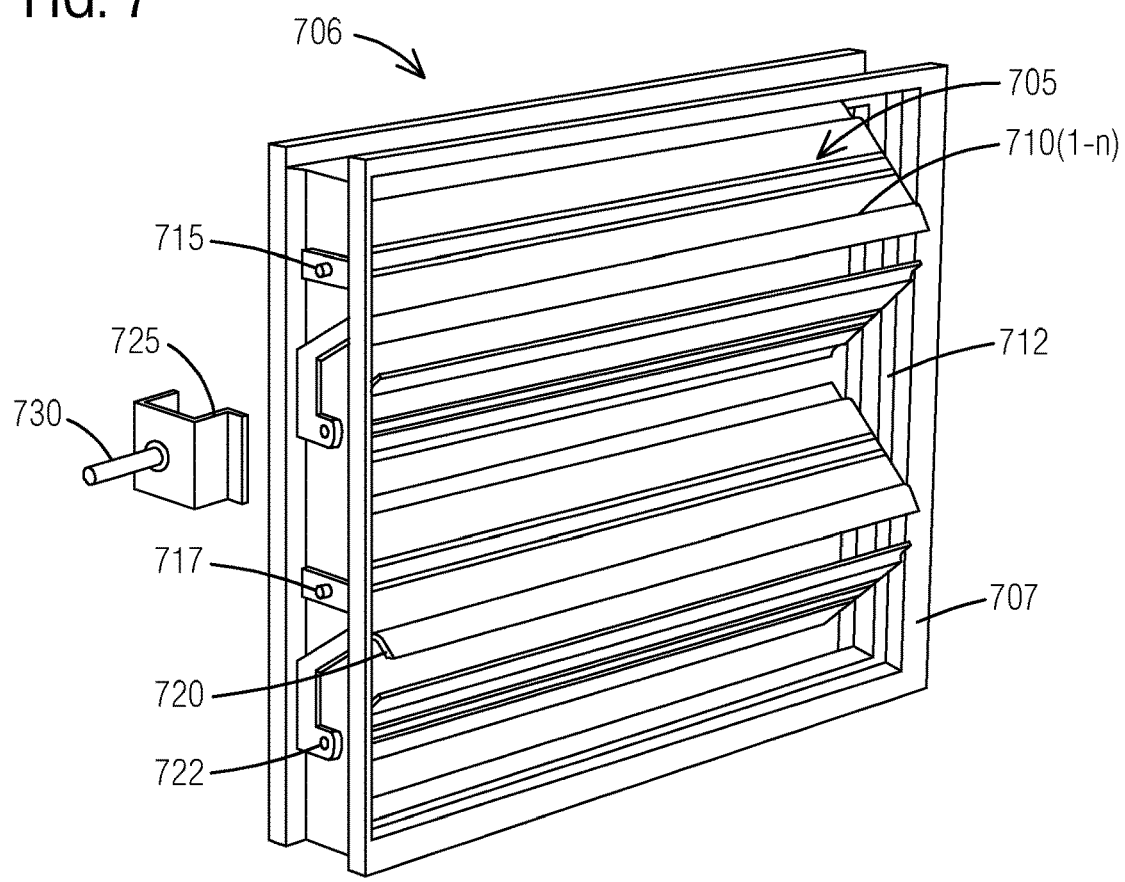
FIG. 7 illustrates parts of another type of damper in accordance with an exemplary embodiment of the present invention.

In FIG. 7, it illustrates parts of another type of damper 705 that may be coupled to and tested by a testing device 110, 205, 305 and/or 505 in accordance with an exemplary embodiment of the present invention to characterize a plurality of torques required to drive the damper 705 to a plurality of pre-determined rotational positions of the damper when subjected to a fluid flow to generate damper rotational position data vs. torque data. The damper 705 is a part of the damper assembly 706 shown in FIG. 7 that comprises a frame 707, a plurality of moveable damper blades 710(1-n) that define the damper 705 and a jamb seal 712. The damper assembly 706 further comprises a plurality of axles 715, 717, a blade . . . seal 720 and a plurality of linkages 722(1-d) that couple adjacent axles 715, 717 to collectively move the damper blades 710(1-n) to corresponding rotational positions between 0 degrees (e.g., fully closed) and 90 degrees (e.g., fully open) based on the rotational position of a primary one of the axles that is coupled to a shaft extension 730 for control by an actuator or a testing device 110, 205, 305 and/or 505. The damper assembly 706 further comprises a standoff bracket 725 having the shaft extension 730.

Figure 8:
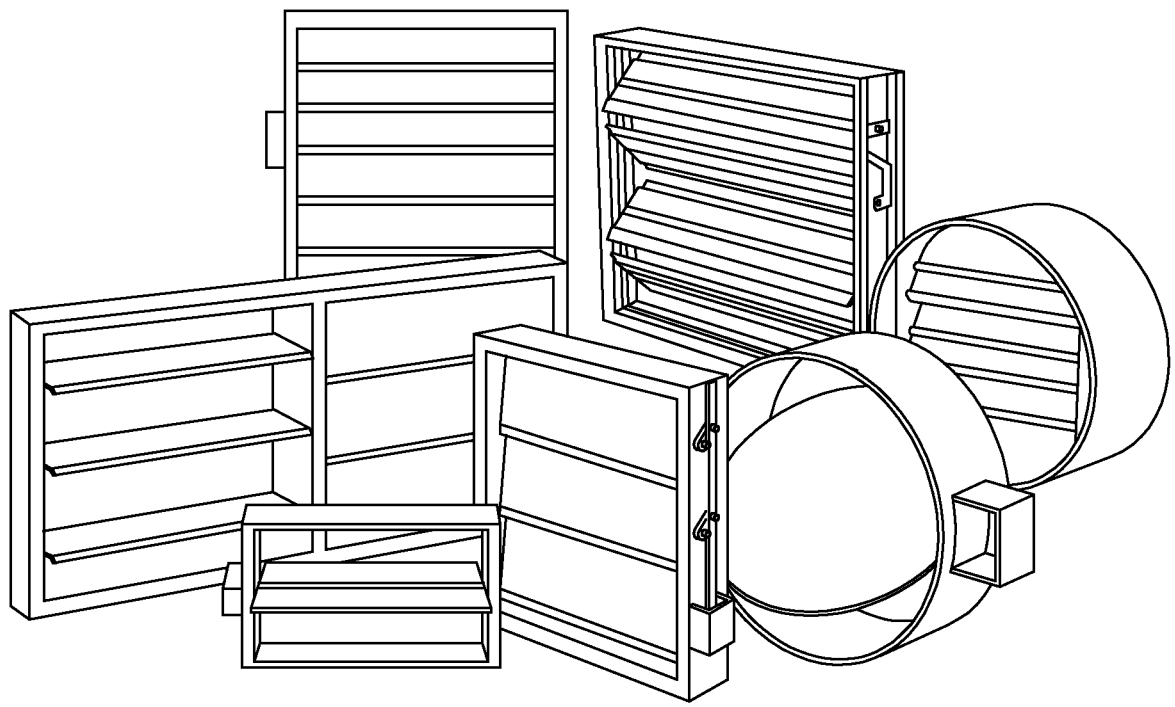
FIG. 8 illustrates different types of a damper in accordance with an exemplary embodiment of the present invention.

With regard to FIG. 8, it illustrates various different types of a damper that may be coupled to and tested by a testing device 110, 205, 305 and/or 505 in accordance with an exemplary embodiment of the present invention. Types of a damper include blade dampers, guillotine dampers, louver dampers, and inlet vane dampers.

With respect to FIG. 9, it illustrates sample torque curves on customer dampers generated using a testing device 110, 205, 305 or 505 in accordance with an exemplary embodiment of the present invention. The curves 905, 907 are examples of the output of a Torque/Force device such as the testing device 110, 205, 305 or 505 after it has tested a customer damper for torque versus rotational position of the damper 507. The upper curve 905 of a top graph shows the torque required when opening the damper 507. The upper curve 905 reflects the Torque/Force device 110, 205, 305, 505 driving the damper 507 open: under electro-mechanical power. A first spike (-A-) reflects the Torque/Force device 110, 205, 305 or 505 overcoming what is typically called a "knee lock" which is part of the damper components that mechanically assist in holding the damper 507 in the closed position. A second spike (-B-) is where the Torque/Force device 110, 205, 305 or 505 or the damper 507 itself has reached its mechanically fully open position. This point is called "stall torque" because it is the maximum driving output due to a mechanically fixed stop.

A lower curve 907 of the top graph in FIG. 9 shows the torque as determined by the Torque/Force device 110, 205, 305 or 505 required when closing the damper 507. The lower curve 907 reflects the Torque/Force device 110, 205, 305, 505 driving the damper 507 closed under electro-mechanical power but now in the opposite direction. A third spike (-C-) reflects the effect of the damper 507 releasing from the fully open position where all damper components were bound tightly by the stall torque applied. A fourth spike (-D-) reflects the Torque/Force device 110, 205, 305, 505 overcoming the re-engagement of the "knee lock" described above.

The curves 910, 912 are other examples of the output of a Torque/Force device such as the testing device 110, 205, 305, or 505 after it has tested a customer damper for torque versus rotational position of the damper 507. The upper curve 910 of a bottom graph shows the torque as determined by the Torque/Force device 110, 205, 305 or 505 required when opening the damper 507. The lower curve 912 of the bottom graph shows the torque as determined by the Torque/Force device 110, 205, 305 or 505 required when closing the damper 507.

Another embodiment of linear stroke valves would have similar output as determined by the Torque/Force device 110, 205, 305 or 505 but force versus linear displacement would replace torque versus rotational position.

Figure 10:
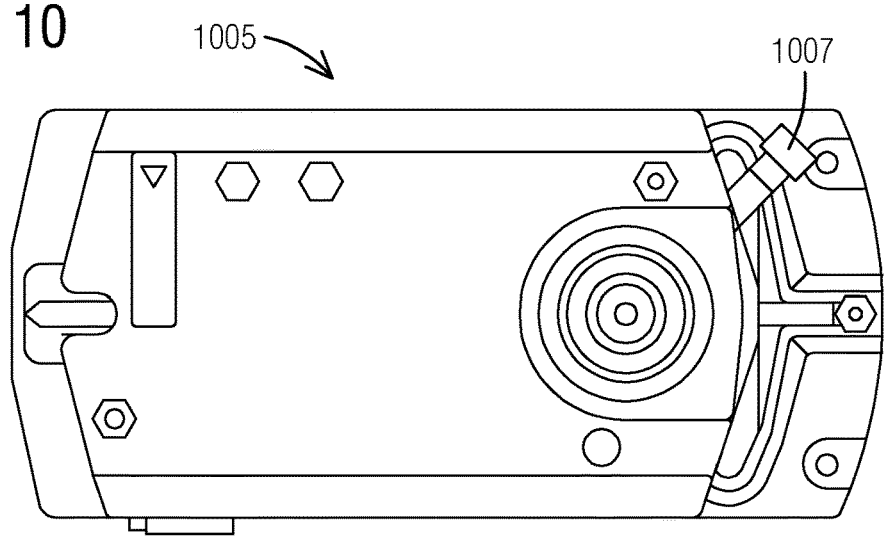
FIG. 10 illustrates a testing device for a damper assembly that obtains torque vs. rotation measurements in accordance with an exemplary embodiment of the present invention.

FIG. 10 illustrates a torque vs. rotation measuring device 1005 in accordance with an exemplary embodiment of the present invention. This torque vs. rotation measuring device 1005 has components consistent with testing device 205 and 505 operates in the same manner as the testing device 505 that interfaces with the damper 507 but is sized and has an actuator adaption 1006 to receive and engage an adaptor shaft of a rotational ball valve. The torque vs. rotation measuring device 1005 also has an adaptor shaft fixation screw 1007.

Figure 11:
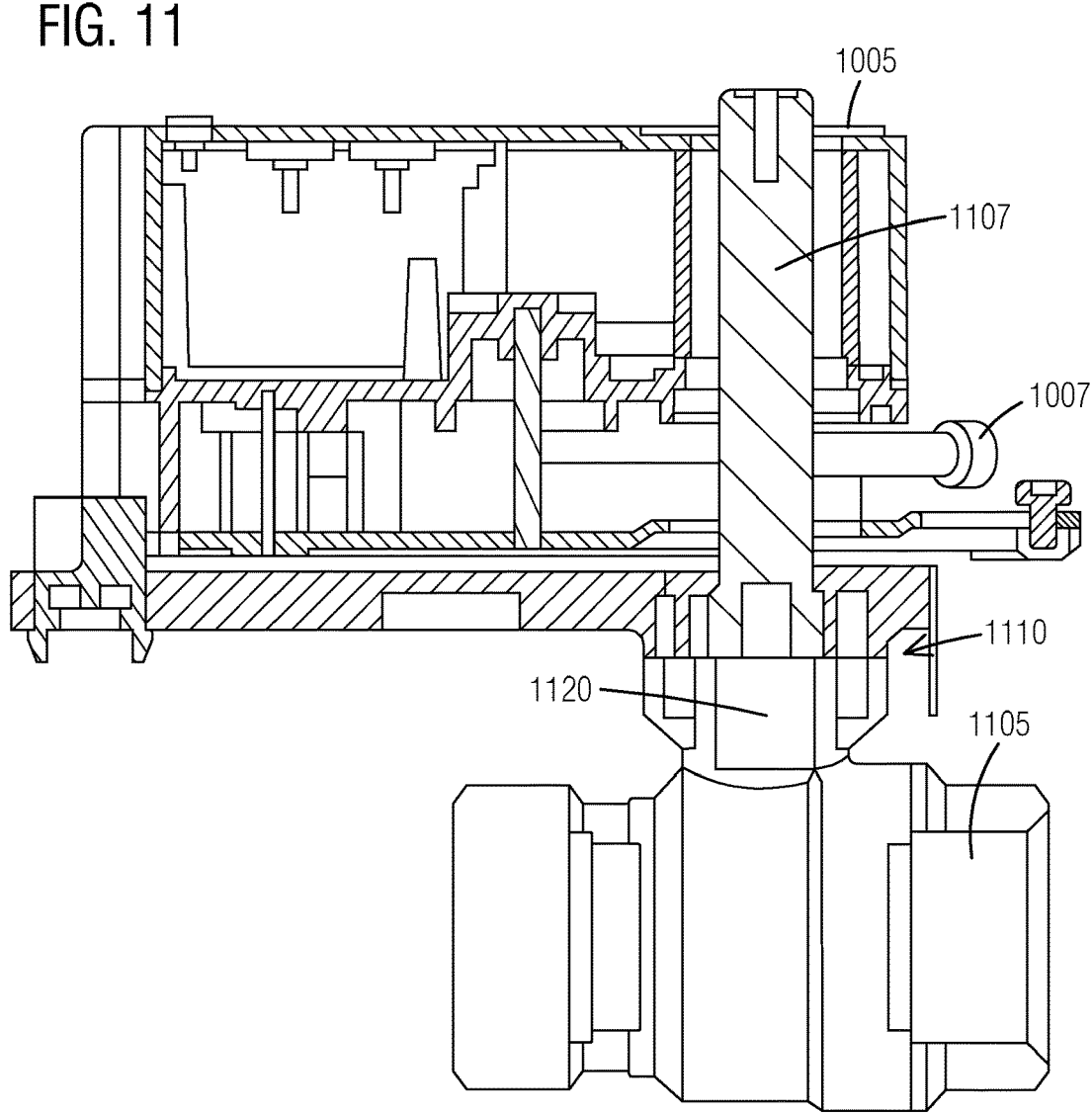
FIG. 11 illustrates a ball valve unit under test in accordance with an exemplary embodiment of the present invention.

FIG. 11 illustrates a ball valve unit or assembly 1105 under test by torque vs. rotation measuring device 1005 in accordance with an exemplary embodiment of the present invention. A ball valve rotational stem adaptor 1107 is the interface between the torque vs. rotation measuring device 1005 and the ball valve unit 1105. The ball valve rotational stem adaptor 1107 is held to the ball valve unit 1105 by a ball valve adaptor mounting plate 1110. The ball valve rotational stem adaptor 1107 is received by the actuator adaption 1006 of the torque vs. rotation measuring device 1005 is engaged to the torque vs. rotation measuring device 1005 by tightening the adaptor shaft fixation screw 1007. When the torque vs. rotation measuring device 1005 is commanded to rotate the ball valve (e.g., a ball damper that is not in view in FIG. 11) of the ball valve unit 1105, the torque vs. rotation measuring device 1005 will rotate a ball valve rotational stem 1120 that is coupled to the ball valve, and measure and record the torque required to drive the rotational stem 1120 to the commanded rotation angular position. This testing by the torque vs. rotation measuring device 1005 can be done with the ball valve unit 1105 mounted in a piping system with fluid pressure and flow or independently under controlled ambient conditions.

Figure 12:
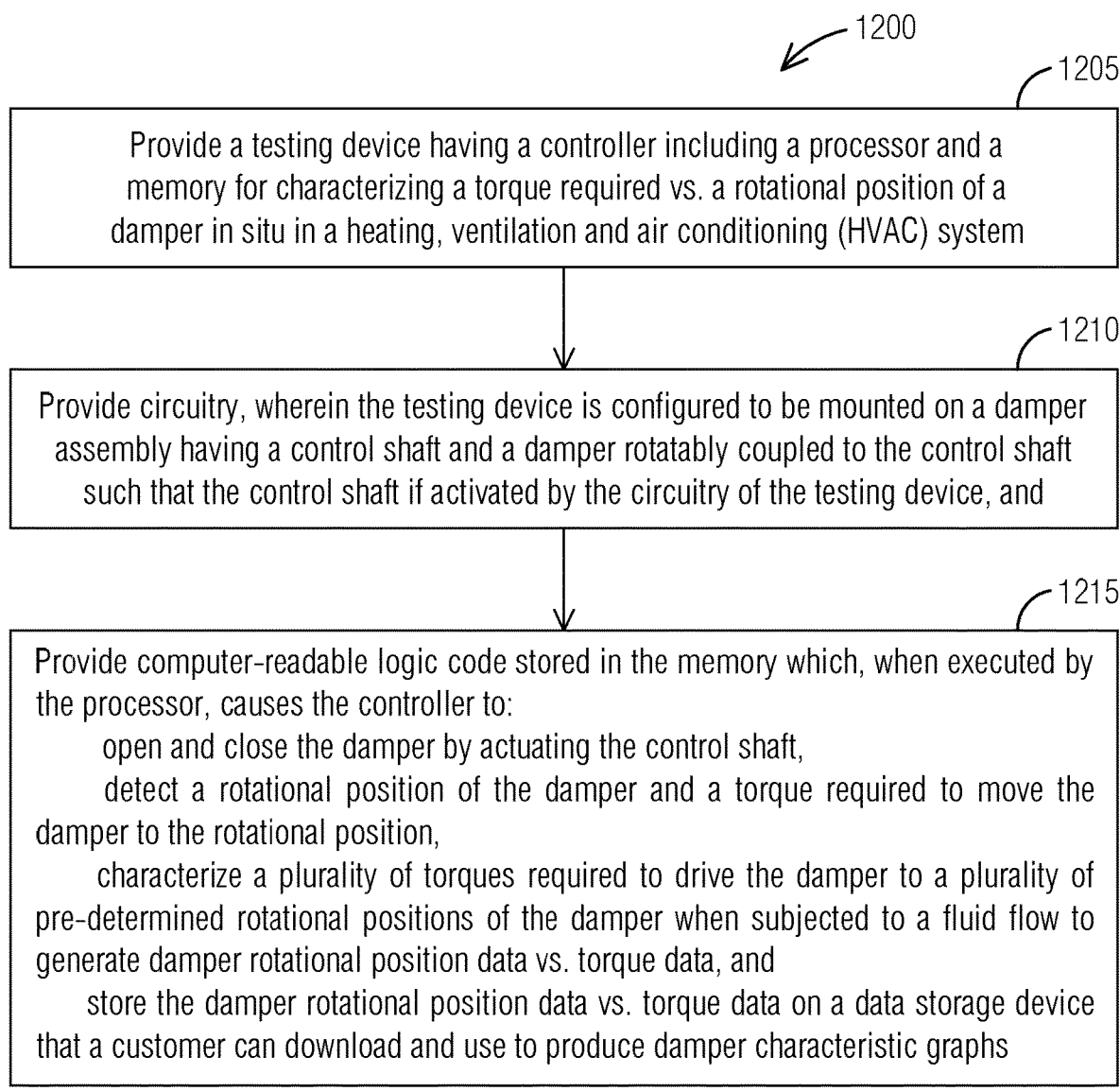
FIG. 12 illustrates a flow chart of a method of characterizing a torque required vs. a rotational position of a damper with a testing device in accordance with an exemplary embodiment of the present invention.

FIG. 12 illustrates an exemplary flow chart of a method 1200 of characterizing a torque required vs. a rotational position of the damper 507 with the testing device 505 in accordance with an exemplary embodiment of the present invention. Reference is made to the elements and features described in FIGS. 1-11. It should be appreciated that some steps are not required to be performed in any particular order, and that some steps are optional.

The method 1200 comprises a step 1205 of providing the testing device 505 having the controller 510 including a processor and a memory for characterizing the damper 507 in situ in a heating, ventilation and air conditioning (HVAC) system. The method 1200 further comprises a step 1210 of providing circuitry. The testing device 505 is configured to be mounted on a damper assembly having a control shaft and the damper 507 rotatably coupled to the control shaft such that the control shaft is activated by the circuitry of the testing device 505. The method 1200 further comprises a step 1215 of providing computer-readable logic code stored in the memory which, when executed by the processor, causes the controller 510 to: open and close the damper 507 by actuating the: control shaft, detect a rotational position of the damper 507 and a torque required to move the damper 507 to the rotational position, characterize a plurality of torques required to drive the damper 507 to a plurality of pre-determined rotational positions of the damper 507 when subjected to a fluid flow to generate damper rotational position data vs. torque data, and store the damper rotational position data vs. torque data on a data storage device that a technician, damper manufacturer customer or other user having reviewed the present invention as disclosed herein may download to produce damper characteristic graphs for selection of the optimal damper actuator for the tested damper assembly.

Figure 13B:
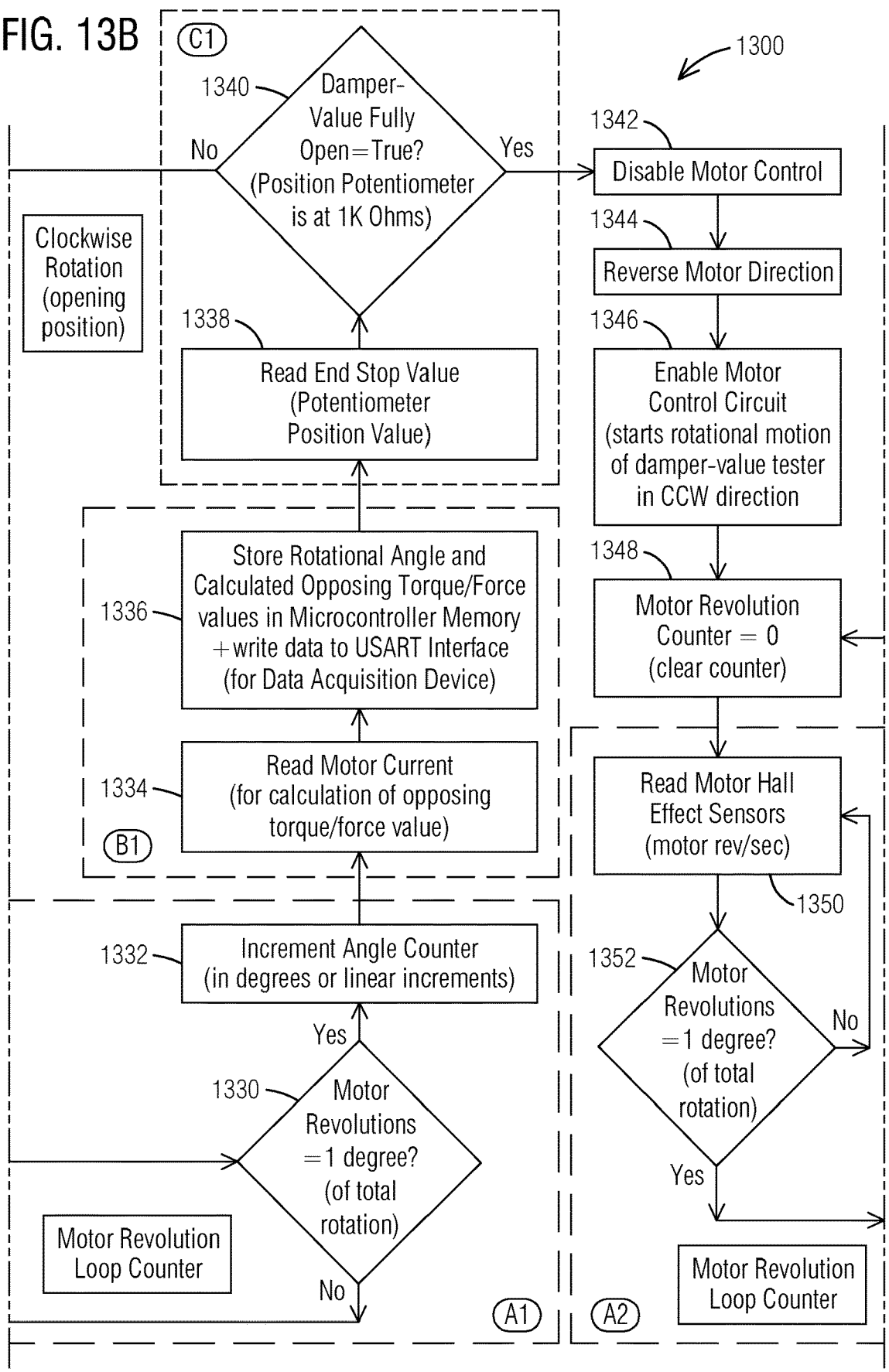
FIG. 13 illustrates a process flow of a damper/valve torque/force testing device in accordance with an exemplary embodiment of the present invention.
Figure 13C:
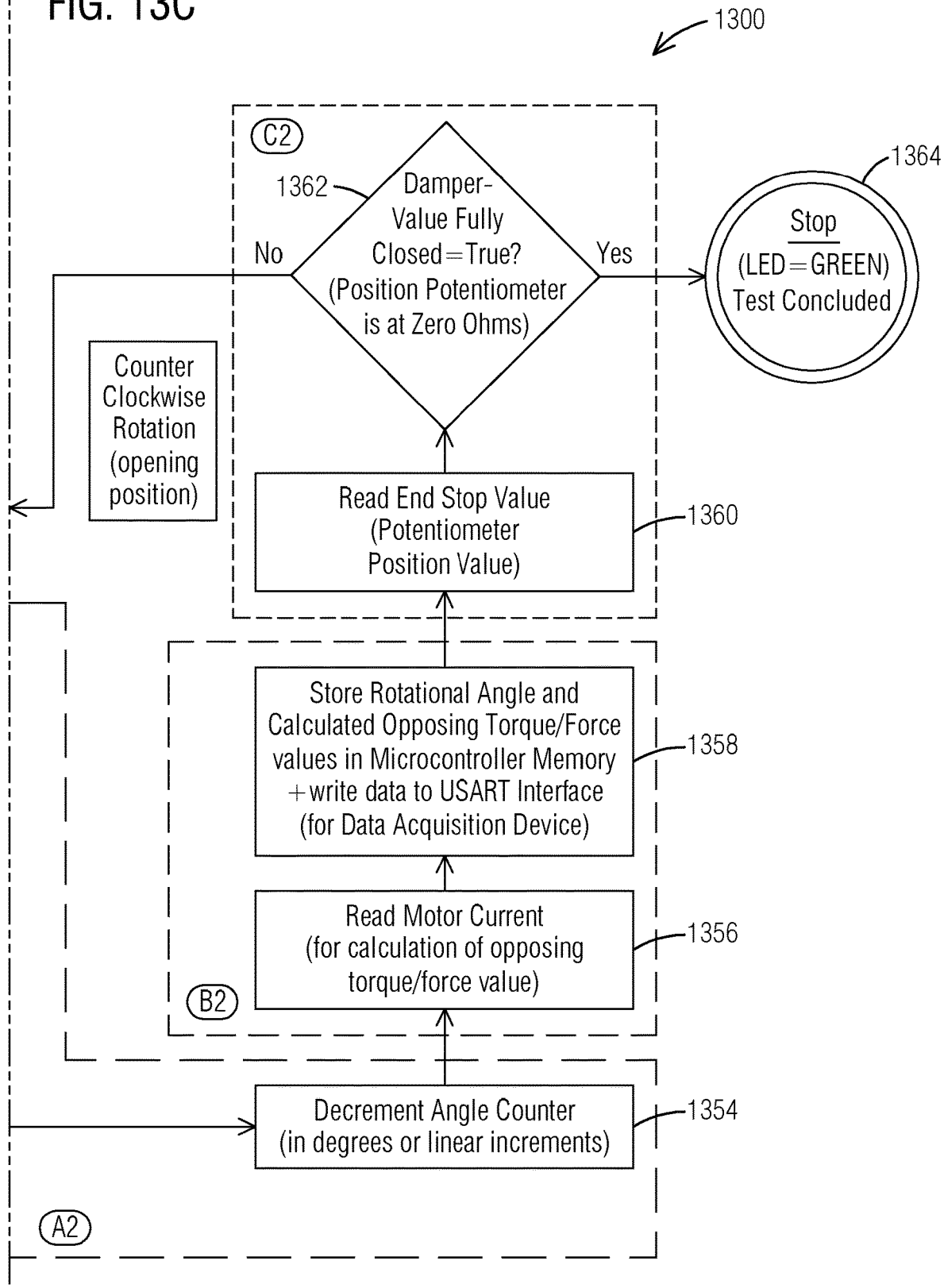

FIG. 13 illustrates a logical process flow 1300 of a damper/valve torque/force testing device such as the testing device 110, 205, 305, 505, 607, or 1005 in accordance with an exemplary embodiment of the present invention. FIG. 13 is broken into three sub-20 figures namely FIG. 13A, FIG. 13B and FIG. 13C. The purpose of this testing device is to measure and characterize the amount of torque or force that is required to fully open and close the damper/valve of both air damper and liquid valve control assemblies, during their normal range of operation. After characterizing the plurality of torques required to drive the damper to a plurality of pre-determined rotational positions of the damper when subjected to a fluid flow to generate damper rotational position data vs. torque data, the testing device may use such damper rotational position data vs. torque data to identify an optimal actuator for use with the tested damper/valve control assembly or provide such data to a technician, damper manufacturer customer or other user having reviewed the present invention as disclosed herein to produce damper characteristic graphs for selection of the optimal damper actuator for the tested damper assembly.

To achieve this goal, a damper/valve torque/force testing device such as testing device 110, 205, 305, 505, 607, or 1005 is attached to a control shaft of a damper/valve assembly to be tested and is used to measure the opposing torque/force developed across that device, as it actively drives the damper/valve open and closed. The opposing torque/force that is measured may be different while the damper/valve under test is opening vs. closing, which is why it must be measured in both functional directions.

To allow proper interpretation of the measured opposing torque/force values which are captured by the damper/valve torque/force testing device, the angular rotation or linear stroke of the damper/valve under test will also be monitored as well and will be correlated with the opposing torque/force values at predetermined intervals. Both the: measured opposing torque/force and corresponding angular rotation or linear stroke will 15 be saved to internal memory within the damper/valve torque/force testing device, and/or communicated to external storage devices which may be attached to the testing device. No intermediate data obtained by the testing device during the performance of the test process depicted in FIG. 13 needs to be stored or maintained (i.e., as temporarily captured between each degree of angular rotation or linear stroke movement) so long as the measured torque/force required to drive the damper/valve to the commanded angular/rotational position is stored and maintained.

Once the damper/valve torque/force testing device is properly attached to the output control shaft of the damper/valve under test and power is applied to the testing device, the device will first clear the internal log (such as data log 567) and all working variables and confirm that the damper/valve under test is in the fully closed position, before commencing the actual test.

Once all of the initial pre-conditions have been confirmed, the damper/valve torque/force testing device will begin to monitor the opposing torque/force and angular rotation or linear stroke, as it drives open the damper/valve under test. If any errors are detected at start-up, such as the damper/valve under test not being fully closed, then testing device will automatically abort the test process depicted in FIG. 13 and an error condition will be reported via an external indicator (e.g., red LED 568 in FIG. 5) located on the damper/valve torque/force testing device itself.

If no error conditions are detected at start-up, then the motor control circuit of the damper/valve torque/force testing device will be enabled, with the maximum amount of drive torque or force that it was designed to supply, being applied to the control shaft of the damper/valve under test. The data logger of the testing device (i.e., a portion of logic code 525 of the testing device 505) will also be enabled at the same time as the motor control circuit as well.

As identified in box A (A1/A2) of the logical process flowchart 1300, after a motor circuit on the damper/valve torque/force testing device has been enabled, a motor will begin to internally rotate. A pinion gear on the internal motor will interface with a multi-gear assembly also in the damper/valve torque/force testing device, so that as the motor rotates, the torque generated by the motor will be mechanically translated to the output control shaft that the damper/valve torque/force testing device is physically connected to on the damper/valve under test.

Due to the multi-gear assembly that the internal motor interfaces, a specific number of motor revolutions will occur (within a defined tolerance band), for each one degree of translation rotation of the control shaft, on the connected damper/valve under test. Hall effect sensors (not in view in Figures) that are disposed internal to the motor about the motor shaft, will be used to monitor the rotation of the motor shaft (and correspondingly the control shaft 620 or extension 730 of the damper assembly under test or stem adaptor 1107 of a ball valve assembly under test) within a specific time period.

The number of actual motor revolutions required for each degree of control shaft rotation will depend on the type and rating of the motor used in the damper/valve torque/force testing device (e.g., testing device 110, 205, 305, 505, 607, or 1005) along with other factors which may change in the design as well over time. Thus, initial calibration data must be acquired with a known opposing torque/force load attached and those calibration factors must also be stored within the internal non-volatile memory of the damper/valve torque/force testing device before actual functional testing of any damper/valve assemblies may occur. To maintain a certain level of accuracy, the damper/valve torque/force testing device should also be periodically re-tested as well (e.g., annually).

Referring to box A (A1/A2) again, of the logical process flowchart, a microcontroller will monitor the Hall effect sensors within the damper/valve torque/force testing device motor and count the total number of those revolutions relative to an internal clock time base as a reference point. Once a specific number of motor revolutions has occurred within a pre-determined time period, then that will equate to one degree or pre-determined linear increment of output (as determined during the calibration cycle). At this point, the angle or linear movement counter is incremented and the logical flow moves onto box B (B1/B2) of the process flowchart.

The process flow in box B (B1/B2) occurs next and the microcontroller within the damper/valve torque/force testing device, will then read a voltage value across the current detection resistors in that circuit and infer the amount of load current running through the drive motor, through the use of the Ohm's law formula $V = I \times R$ (therefore $I = V$ divided by $R$, where I is current in amps, V is voltage and R is the resistance in ohms across the current detection resistors). That motor load current will in turn be used to calculate the amount of opposing torque present on the output control shaft of the damper/valve under test as compared against the previously stored calibration factors. The opposing torque will thus cause the motor load current to increase from the unloaded value, which is how it may be calculated, i.e. due to the difference between the two values, as measured at each rotational degree interval during the test. The opposing torque/force will then be correlated with the current movement (in degrees or predetermined linear stroke movement) of the output control shaft and both values will be stored (along with an appropriate time stamp), in the internal microcontroller memory and/or sent via other communication interfaces for external data collection too. For example, the first stored torque 532(1) or next stored torque 532(2) or last stored torque 532 (n) is for respective current rotational position 530. The "Rotational angle" in FIG. 13 is correlated to the rotational position 530 here.

Once the opposing torque/force, rotational angle or linear stroke movement and time stamp data values have been stored or otherwise communicated to an external interface, box C(C1/C2) of the logical process flowchart will be entered. It is in the process steps of box C(C1/C2), that the end stop detection will be monitored by the controller via a separate potentiometer disposed within the damper/valve torque/force testing device such that external terminals of the potentiometer are connectable to a damper position sensor that provides a voltage output to the potentiometer to reflect if the damper valve under test: is fully closed (e.g., 0 degrees opening) or fully open (e.g., 90 degrees opening), depending on the direction of rotation. Once the end stop has been encountered, i.e., when the position potentiometer has reached its extreme value of either zero ohms or 1K ohms (depending on the direction of rotation) then the damper/valve torque/force testing device will either change direction from opening to closing and continue collecting data again, or the test will: have completed if data has been collected for both a full stroke open and closed. If the end stop has not been reached yet during the test of the position potentiometer in box C(C1/C2), then the motor revolution counter will be cleared to zero and the process to detect the next one degree or predetermined linear stroke movement increment/decrement of stroke will continue along with the corresponding opposing torque/force detection at each degree interval as well.

It's also important to note that certain error conditions may occur during execution of the test such as the opposing torque/force exceeding the maximum drive torque or linear thrust of the damper/valve torque/force testing device which would cause test completion to fail. All defined error conditions may be reflected in an encoded flashing pattern of the external indicator red LED 568, as the reporting mechanism by the controller 510.

Turning again to FIG. 13, the process 1300 performed by the damper/valve torque/force testing device is described in further detail. In FIG. 13A, after enabling power to the tester (e.g., testing device 110, 205, 305, 505, 607, or 1005) or after user selecting start the damper torque tester process 550 via user interface 547 (step 1302), the testing device clears or resets the internal data log 567 in microcontroller memory 512 (step 1304). Previously detected rotational position 530 and corresponding derived torque 532 as well as previously characterized damper rotational position data vs. torque data 535 associated with the last damper to be tested are cleared. The testing device may also clear or reset working parameters for this test process (step 1306) such as the timer 570, motor revolution counter 575(1), angle counter 575(2), and motor current 577. "End Stop Value" corresponding to the damper under test may also be cleared or reset. The timer 570 is started at a step 1308. Next, the testing device determines whether the timer value is greater than a pre-determined inrush current delay time associated with the powering up of the testing device (e.g., 0.25 seconds). Upon determining that the time value is not greater than a pre-determined inrush current delay time, the timer is incremented (1312) and proceeds to step 1310.

If it is determined that the time value is greater than a pre-determined inrush current delay time, the testing device reads the current end stop value for the damper under test (step 1314). For example, the testing device may read the damper rotational feedback device 210 such as a potentiometer that reflects if the damper under test is fully closed (e.g., 0 degrees opening) or fully open (e.g., 90 degrees opening). Next, the testing device determines whether the damper is fully closed (step 1316) based on the end stop value; for example, if the potentiometer employed as a damper rotational feedback device is at zero ohms or a value previously calibrated to reflect a fully closed damper position. If it is determined that the damper is not fully closed, then the testing device stops testing the damper (step 1318) and reports associated error conditions (step 1320). As part of reporting associated error conditions, the testing device may output an encoded flashing pattern to the external indicator red LED 568 to reflect the associated error condition. Examples of possible error conditions that could be reported via the red LED might be as follows: misaligned damper/valve shaft relative to the output of the testing device, torque or linear force exceeds rated capacity of testing device, end stop not detected on . . . damper/valve assembly, etc.

If it is determined that the damper is fully closed, the testing device starts the data logger (i.e., the portion of logic code 525 of the testing device 505 that maintains the data log 567) at a step 1322. As part of step 1322 or prior step, the damper assembly having the damper under test is subjected to a fluid flow in situ in the HVAC system 105 so that the testing device can test the damper under applicable maximum air flow (or water flow for a pipe valve assembly) conditions. Next, the testing device enables the motor control circuit 565 (step 1324), to cause the motor and the circuitry 515 to start the actuation (i.e., the angular or linear rotation) of the control shaft 520 of the damper assembly in a pre-determined direction (e.g., a clock-wise rotation direction). Then in a next step 1326, the testing device reads the motor Hall effect sensors disposed internal to the motor about the motor shaft and increments the motor revolution counter 575(1) if the detected value of the motor Hall effect sensors corresponds to a full revolution of the motor shaft.

Turning to FIG. 13B, the testing device then determines whether the number of motor revolutions equals 1 degree of rotation of the control shaft for the damper under test: (step 1326) by reading the motor revolution counter 575(1). As described herein, the number of actual motor revolutions required for each degree of control shaft rotation will depend on the type and rating of the motor used in the damper/valve torque/force testing device (e.g., testing device 110, 205, 305, 505, 607, or 1005) along with other factors which may change in the design as well over time. If the testing device determines that the number of motor revolutions does not equal 1 degree of rotation of the control shaft of the damper under test, the testing device continues to step 1326 of FIG. 13A. If the testing device determines that the number of motor revolutions does equal 1 degree of rotation of the control shaft of the damper under test (step 1330), the testing device then increments the angle counter 575(2) at a step 1332. As described herein, the angle counter corresponds to the current rotational position or angle of the damper within the damper assembly under test by the testing device 505.

Next, having determined that the current rotational position or angle of the damper has reached another degree of total rotation (e.g., damper's rotational position is opened another degree), the testing device reads the motor current 577 (i.e. as per the Ohm's Law relationship, $I_{(amps)}=V_{(volts)}$ divided by $R_{(ohms)}$) and then stores the data used 512(2) for determining the corresponding torque or force required to actuate the control shaft of the damper assembly to move the damper to the current rotational position or angle (step 1334). In SI units, the motor torque (Newton-meters) is then calculated by the formula $T_{(Nm)}=I_{(amps)} \times k_{T(Nm/amp)}$, where I is the motor current in amps derived from the voltage measured across the current detection resistors in series with the motor as per Ohm's Law and $k_T$ is the torque constant in Newton-meters per amp. The torque constant $k_T$ is a fixed parameter defined in the datasheet specifications for the motor model used in the testing device. Where the torque constant $k_T$ is unavailable, the voltage constant $k_v$ may be present in the motor datasheet specifications instead and may be substituted into the . . . motor torque formula as per the relationship $k_T=1/k_v$. Subsequently, the total output torque of the testing device, can be calculated by multiplying the input torque by the final gear ratio of the testing device, where the input torque is defined as the motor torque (i.e. $Tout_{(Nm)}=Tmotor_{(Nm)} \times Gear_{(ratio)}$). For comparison with stored damper/valve characteristic curves, the torque values in SI units may also be converted to imperial units using the following formula, Torque in pound-inches (lb-in)=(Torque in Newton-meters)×(0.224809 pounds)×(39.3701 inches).

The testing device then stores rotational position or angle in association with the calculated opposing torque or force values as a current record of the damper rotational position data vs. torque data 535 of the data log 567 in memory (step 1336). The current damper rotational position data vs. torque data 535 of the data log 567 may also or alternatively be stored on a data storage device 540 that may advantageously be used to produce damper characteristic graphs 545 for selection of the optimal damper actuator for the damper assembly under test.

Next, the testing device again reads the current end stop value for the damper under test (1338). The testing device then determines whether damper is fully open (step 1340) based on the end stop value; for example, if the potentiometer employed as a damper rotational feedback device is at 1$k$ ohms or a value previously calibrated to reflect a fully open damper position If it is determined that the damper is not fully open, then the testing device clears or resets the motor revolution counter to zero (step 1328 of FIG. 13A) to repeat the process for characterizing the damper rotational position or angle versus torque for another degree of rotation of the control shaft of the damper under test.

Otherwise, if it is determined that the damper is fully open, then the testing device disables the motor control (step 1342) and reverses the motor direction (step 1344). The testing device then enables the motor control circuit 565 (step 1346), to cause the motor and the circuitry 515 to start the actuation (i.e., the angular or linear rotation) of the control shaft 520 of the damper assembly in a pre-determined reverse direction (e.g., a counter clock-wise rotation direction) so that the testing device may continue the process 1300 for advantageously characterizing the rotational position or angle versus torque for the damper under test in the pre-determined reverse direction. The testing device next clears or resets the motor revolution counter to zero (step 1348). The testing device reads motor Hall effect sensors disposed internal to the motor about the motor shaft and increments the motor revolution counter 575(1) if the detected value of the motor Hall effect sensors correspond to a full revolution of the motor shaft in the pre-determined reverse direction (step 1350). The testing device then determines whether the number of motor revolutions equals 1 degree of rotation of the control shaft for the damper under test (step 1352) by reading the motor revolution counter 575(1). If the testing device determines that the number of motor revolutions does not equal 1 degree of rotation of the control shaft of the damper under test, the testing device continues to repeat step 1350 while the motor is still enabled.

Turning to FIG. 13C, if the testing device determines that the number of motor revolutions does equal 1 degree of rotation of the control shaft of the damper under test, the testing device then decrements the angle counter 575(2) at a step 1354. While the motor is enabled to move in the pre-determined reverse direction and the angle counter counts down, the angle counter corresponds to a previously measured rotational position or angle of the damper within the damper assembly under test by the testing device 505 (e.g., from fully open to fully closed) but with a motor current or corresponding torque for moving the control shaft of the damper under test in the predetermined reverse direction. This allows the testing device to advantageously characterize the rotational position or angle of the damper versus the corresponding required torque in the pre-determined reverse direction of the damper under test. At a next step 1356, motor current is read.

Next, having determined that the current rotational position or angle of the damper has reached another degree of total rotation in the reverse direction (e.g., damper's rotational position is closed another degree), the testing device reads and stores the motor current 577 for determining the corresponding torque or force required to actuate the control shaft of the damper assembly to move the damper to the current rotational position or angle (step 1356). The testing device then stores rotational position or angle in the predetermined reverse direction in association with the calculated opposing torque or force values as a current record of the damper rotational position data vs. torque data 535 of the data log 567 in memory (step 1358). As previously described herein, the current damper rotational position data vs. torque data 535 of the data log 567 may also or alternatively be stored on a data storage device 540 that may advantageously be used to produce damper characteristic graphs 545 for selection of the optimal damper actuator for the damper assembly under test.

Thereafter at a following step 1360, the testing device again reads the current end stop value for the damper under test. Next, the testing device determines whether the damper is fully closed (step 1362) based on the end stop value; for example, if the potentiometer employed as a damper rotational feedback device is at zero ohms or a value previously calibrated to reflect a fully closed damper position. If it is determined that the damper is not fully closed, then the testing device continues testing at step 1348 of FIG. 13B to again clear or reset the motor revolution counter to zero (step 1328 of FIG. 13A) to repeat the process for characterizing the damper rotational position or angle versus torque for another degree of rotation of the control shaft of the damper under test in the pre-determined reverse direction. If it is determined that the damper is fully closed, then the testing device enable or turn on the green LED of the external indicator to reflect a successful completion of the process 1300 by the testing device 505 before concluding the testing of the damper under test (step 1364).

The testing device comprises a motor having a motor shaft that is coupled to the control shaft of the damper assembly and a motor revolution counter that identifies a number of revolutions of the motor shaft. The controller controls the motor to actuate the control shaft. To characterize one of the torques required to drive the damper to a corresponding one of the plurality of pre-determined rotational positions. The controller reads a number of motor revolutions from the motor revolution counter, determines whether the number of motor revolutions equals one degree of rotation of the control shaft for the damper and when it is determined that the number of motor revolutions equals one degree of rotation of the control shaft, reads a motor current corresponding to the one of the torques and derives the one of the torques based on the read motor current. The testing device further comprises a motor with Hall effect sensors disposed internal to the motor about the motor shaft. The controller reads a voltage value from the motor Hall effect sensors and determines whether the number of motor revolutions equals one degree of rotation of the control shaft for the damper based on the voltage value of the motor Hall effect sensors.

The testing device further comprises an angle counter. When it is determined that the number of motor revolutions equals one degree of rotation of the control shaft, the controller stores a current value of the angle counter as the corresponding one of the plurality of pre-determined rotational positions in association with the derived one of the torques. The testing device further comprises a damper end stop detector. The controller reads a current value of the damper end stop detector. The testing device then determines whether the damper is fully open based on the current damper end stop value.

The testing device further comprises a plurality of motor Hall effect sensors disposed internal to the motor about the motor shaft. If it is determined that the damper is fully open, then the controller disables the motor, resets the motor revolution counter, and reverses a motor direction. The controller then enables the motor to cause the actuation of the control shaft of the damper assembly in a pre-determined reverse direction. The controller reads a respective voltage value of each of the motor Hall effect sensors and increments the motor revolution counter when a detected value of the motor Hall effect sensors corresponds to a full revolution of the motor shaft in the pre-determined reverse direction based on the respective voltage values of the motor Hall effect sensors.

To characterize another one of the torques required to drive the damper to the corresponding one of the plurality of pre-determined rotational positions in the pre-determined reverse direction, the controller: reads another number of motor revolutions from the motor revolution counter, determines whether the other number of motor revolutions equals one degree of rotation of the control shaft for the damper, and when it is determined that the other number of motor revolutions equals one degree of rotation of the control shaft, reads a motor current corresponding to the other one of the torques and derives the other one of the torques based on the read motor current.

The testing device further comprises an angle counter. When it is determined that the other number of motor revolutions equals one degree of rotation of the control shaft, the controller stores a current value of the angle counter as the corresponding one of the plurality of pre-determined rotational positions in association with the derived other one of the torques.

The testing device further comprises a motor having a motor shaft that is coupled to the control shaft of the damper assembly, a motor revolution counter that identifies a number of revolutions of the motor shaft, a motor with Hall effect sensors disposed internal to the motor about the motor shaft and an angle counter. The controller controls the motor to actuate the control shaft in a clock-wise direction. To characterize each of the torques required to drive the damper to a corresponding one of the plurality of pre-determined rotational positions in the clock-wise direction, the controller:
   a) reads a number of motor revolutions from the motor revolution counter;
   b) reads a voltage value of the motor Hall effect sensors;
   c) determines whether the number of motor revolutions equals one degree of rotation of the control shaft for the damper based on the voltage value of the motor Hall effect sensors;
   d) when it is determined that the number of motor revolutions equals one degree of rotation of the control shaft, increments the angle counter, reads a motor current, derives a corresponding torque based on the read motor current, and stores a current value of the angle counter as the corresponding one of the plurality of pre-determined rotational positions in association with the derived torque; and
   e) repeats steps (a), (b), (c), and (d) until the controller detects the damper has reached an end stop position.

The testing device further comprises a damper manufacturing database and a look-up table including performance metrics. The controller determines an optimal actuator having performance metrics that meet damper characteristics depicted by the damper rotational position data vs. torque data on the data storage device.

While a blade damper is described herein a range of one or more other dampers or other forms of dampers are also contemplated by the present invention. For example, other types of dampers may be implemented based on one or more features presented above without deviating from the spirit of the present invention.

The techniques described herein can be particularly useful for a linear stroke valve or a ball valve. While particular embodiments are described in terms of these valves, the techniques described herein are not limited to such a structure but can also be used with other valves.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with . . . which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific . . . embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A testing device to characterize a damper in situ in a heating, ventilation and air conditioning (HVAC) system, the testing device comprising:
   a controller including a processor and a memory;
   circuitry,
   wherein the testing device is configured to be mounted on a damper assembly having a control shaft and a damper rotatably coupled to the control shaft such that the control shaft is activated by the circuitry of the testing device; and
   computer-readable logic code stored in the memory which, when executed by the processor, causes the controller to:
   open and close the damper by actuating the control shaft,
   detect a rotational position of the damper and a torque required to move the damper to the rotational position,
   characterize a plurality of torques required to drive the damper to a plurality of pre-determined rotational positions of the damper when subjected to a fluid flow to generate damper rotational position data vs. torque data, and
   store the damper rotational position data vs. torque data on a data storage device; and
   a damper manufacturing database and a look-up table including performance metrics, wherein the controller determines an optimal actuator having performance metrics that meet damper characteristics depicted by the damper rotational position data vs. torque data on the data storage device.

2. The testing device of claim 1, further comprising:
   a user interface wherein the controller deploys the user interface to interactively control a damper torque tester process.

3. The testing device of claim 1, further comprising:
   a motor having a motor shaft that is coupled to the control shaft of the damper assembly; and
   a motor revolution counter that identifies a number of revolutions of the motor shaft,
   wherein the controller controls the motor to actuate the control shaft, and
   wherein, to characterize one of the torques required to drive the damper to a corresponding one of the plurality of pre-determined rotational positions, the controller:
   reads a number of motor revolutions from the motor revolution counter;
   determines whether the number of motor revolutions equals one degree of rotation of the control shaft for the damper; and
   when it is determined that the number of motor revolutions equals one degree of rotation of the control shaft, reads a motor current corresponding to the one of the torques and derives the one of the torques based on the read motor current.

4. The testing device of claim 3, further comprising:
   a plurality of Hall effect sensors with the motor such that the Hall effect sensors are disposed internal to the motor about the motor shaft,
   wherein the controller reads a voltage value of the motor plurality of Hall effect sensors and determines whether the number of motor revolutions equals one degree of rotation of the control shaft for the damper based on the voltage value of the motor plurality of Hall effect sensors.

5. The testing device of claim 3, further comprising:
an angle counter,
wherein when it is determined that the number of motor revolutions equals one degree of rotation of the control shaft, the controller stores a current value of the angle counter as the corresponding one of the plurality of pre-determined rotational positions in association with the derived one of the torques.

6. The testing device of claim 3, further comprising:
a damper end stop detector,
wherein the controller reads a current value of the damper end stop detector, and
wherein the testing device then determines whether the damper is fully open based on the current damper end stop value.

7. The testing device of claim 6, further comprising:
a plurality of motor Hall effect sensors disposed internal to the motor about the motor shaft,
wherein if it is determined that the damper is fully open, then the controller disables the motor, resets the motor revolution counter, and reverses a motor direction,
wherein the controller then enables the motor to cause the actuation of the control shaft of the damper assembly in a pre-determined reverse direction, and
wherein the controller reads a respective voltage value of each of the motor Hall effect sensors and increments the motor revolution counter when a detected value of the motor Hall effect sensors corresponds to a full revolution of the motor shaft in the pre-determined reverse direction based on the respective voltage values of the motor Hall effect sensors.

8. The testing device of claim 7, wherein, to characterize another one of the torques required to drive the damper to the corresponding one of the plurality of pre-determined rotational positions in the pre-determined reverse direction, the controller:
reads another number of motor revolutions from the motor revolution counter;
determines whether the other number of motor revolutions equals one degree of rotation of the control shaft for the damper; and
when it is determined that the other number of motor revolutions equals one degree of rotation of the control shaft, reads a motor current corresponding to the other one of the torques and derives the other one of the torques based on the read motor current.

9. The testing device of claim 8, further comprising:
an angle counter,
wherein when it is determined that the other number of motor revolutions equals one degree of rotation of the control shaft, the controller stores a current value of the angle counter as the corresponding one of the plurality of pre-determined rotational positions in association with the derived other one of the torques.

10. The testing device of claim 1, further comprising:
a motor having a motor shaft that is coupled to the control shaft of the damper assembly;
a motor revolution counter that identifies a number of revolutions of the motor shaft;
a motor with Hall effect sensors disposed internal to the motor about the motor shaft; and
an angle counter;
wherein the controller controls the motor to actuate the control shaft in a clock-wise direction; and wherein, to characterize each of the torques required to drive the damper to a corresponding one of the plurality of pre-determined rotational positions in the clock-wise direction, the controller:
a). reads a number of motor revolutions from the motor revolution counter;
b). reads a voltage value of the motor Hall effect sensors;
c). determines whether the number of motor revolutions equals one degree of rotation of the control shaft for the damper based on the voltage value of the motor Hall effect sensors;
d). when it is determined that the number of motor revolutions equals one degree of rotation of the control shaft, increments the angle counter, reads a motor current, derives a corresponding torque based on the read motor current, and stores a current value of the angle counter as the corresponding one of the plurality of pre-determined rotational positions in association with the derived torque; and
e). repeats steps (a), (b), (c), and (d) until the controller detects the damper has reached an end stop position.

11. A method of characterizing a torque required vs. a rotational position of a damper with a testing device, the method comprising:
providing a controller including a processor and a memory for characterizing the damper in situ in a heating, ventilation and air conditioning (HVAC) system;
providing circuitry,
wherein the testing device is configured to be mounted on a damper assembly having a control shaft and a damper rotatably coupled to the control shaft such that the control shaft is activated by the circuitry of the testing device; and
providing computer-readable logic code stored in the memory which, when executed by the processor, causes the controller to:
open and close the damper by actuating the control shaft,
detect a rotational position of the damper and a torque required to move the damper to the rotational position,
characterize a plurality of torques required to drive the damper to a plurality of pre-determined rotational positions of the damper when subjected to a fluid flow to generate damper rotational position data vs. torque data, and
store the damper rotational position data vs. torque data on a data storage device;
providing a motor having a motor shaft that is coupled to the control shaft of the damper assembly;
providing a motor revolution counter that identifies a number of revolutions of the motor shaft; and
providing a plurality of motor Hall effect sensors disposed internal to the motor about the motor shaft,
wherein if it is determined that the damper is fully open, then the controller disables the motor, resets the motor revolution counter, and reverses a motor direction,
wherein the controller then enables the motor to cause the actuation of the control shaft of the damper assembly in a pre-determined reverse direction, and
wherein the controller reads a respective voltage value of each of the motor Hall effect sensors and increments the motor revolution counter when a detected value of the motor Hall effect sensors corresponds to a full revolution of the motor shaft in the pre-determined reverse direction based on the respective voltage values of the motor Hall effect sensors.

12. The method of claim 11, further comprising:
providing a user interface wherein the controller deploys the user interface to interactively control a damper torque tester process;
wherein the controller controls the motor to actuate the control shaft, and
wherein, to characterize one of the torques required to drive the damper to a corresponding one of the plurality of pre-determined rotational positions, the controller:
reads a number of motor revolutions from the motor revolution counter;
determines whether the number of motor revolutions equals one degree of rotation of the control shaft for the damper; and
when it is determined that the number of motor revolutions equals one degree of rotation of the control shaft, reads a motor current corresponding to the one of the torques and derives the one of the torques based on the read motor current.

13. The method of claim 11, further comprising:
a motor having a motor shaft that is coupled to the control shaft of the damper assembly; and
a motor revolution counter that identifies a number of revolutions of the motor shaft,
wherein the controller controls the motor to actuate the control shaft, and
to characterize one of the torques required to drive the damper to a corresponding one of the plurality of pre-determined rotational positions, the controller:
reads a number of motor revolutions from the motor revolution counter;
determines whether the number of motor revolutions equals one degree of rotation of the control shaft for the damper; and
when it is determined that the number of motor revolutions equals one degree of rotation of the control shaft, reads a motor current corresponding to the one of the torques and derives the one of the torques based on the read motor current.

14. The method of claim 13, further comprising:
providing a damper end stop detector,
wherein the controller reads a current value of the damper end stop detector, and
wherein the testing device then determines whether the damper is fully open based on the current damper end stop value.

15. The method of claim 11,
wherein the controller reads a voltage value of the motor Hall effect sensors and determines whether a number of motor revolutions equals one degree of rotation of the control shaft for the damper based on the voltage value of the motor Hall effect sensors.

16. The method of claim 11, further comprising:
providing an angle counter,
wherein when it is determined that the number of motor revolutions equals one degree of rotation of the control shaft, the controller stores a current value of an angle counter as corresponding one of the plurality of pre-determined rotational positions in association with derived one of the torques.

17. The method of claim 11, further comprising:
providing an angle counter;
wherein the controller controls the motor to actuate the control shaft in a clock-wise direction; and
wherein, to characterize each of the torques required to drive the damper to a corresponding one of the plurality of pre-determined rotational positions in the clock-wise direction, the controller:
k). reads a number of motor revolutions from the motor revolution counter;
l). reads a voltage value of the motor Hall effect sensors;
m). determines whether the number of motor revolutions equals one degree of rotation of the control shaft for the damper based on the voltage value of the motor Hall effect sensors;
n). when it is determined that the number of motor revolutions equals one degree of rotation of the control shaft, increments the angle counter, reads a motor current, derives a corresponding torque based on the read motor current, and stores a current value of the angle counter as the corresponding one of the plurality of pre-determined rotational positions in association with the derived torque; and
o). repeats steps (k), (l), (m), and (n) until the controller detects the damper has reached an end stop position.

18. A testing device to characterize a damper in situ in a heating, ventilation and air conditioning (HVAC) system, the testing device comprising:
a controller including a processor and a memory;
circuitry,
wherein the testing device is configured to be mounted on a damper assembly having a control shaft and a damper rotatably coupled to the control shaft such that the control shaft is activated by the circuitry of the testing device;
computer-readable logic code stored in the memory which, when executed by the processor, causes the controller to:
open and close the damper by actuating the control shaft,
detect a rotational position of the damper and a torque required to move the damper to the rotational position,
characterize a plurality of torques required to drive the damper to a plurality of pre-determined rotational positions of the damper when subjected to a fluid flow to generate damper rotational position data vs. torque data, and
store the damper rotational position data vs. torque data on a data storage device;
a motor having a motor shaft that is coupled to the control shaft of the damper assembly;
a motor revolution counter that identifies a number of revolutions of the motor shaft; and
a plurality of motor Hall effect sensors disposed internal to the motor about the motor shaft,
wherein if it is determined that the damper is fully open, then the controller disables the motor, resets the motor revolution counter, and reverses a motor direction,
wherein the controller then enables the motor to cause the actuation of the control shaft of the damper assembly in a pre-determined reverse direction, and
wherein the controller reads a respective voltage value of each of the motor Hall effect sensors and increments the motor revolution counter when a detected value of the motor Hall effect sensors corresponds to a full revolution of the motor shaft in the pre-determined reverse direction based on the respective voltage values of the motor Hall effect sensors.

19. The testing device of claim 18, further comprising:
a user interface wherein the controller deploys the user interface to interactively control a damper torque tester process;

wherein the controller controls the motor to actuate the control shaft, and wherein, to characterize one of the torques required to drive the damper to a corresponding one of the plurality of pre-determined rotational positions, the controller:

reads a number of motor revolutions from the motor revolution counter;

determines whether the number of motor revolutions equals one degree of rotation of the control shaft for the damper; and when it is determined that the number of motor revolutions equals one degree of rotation of the control shaft, reads a motor current corresponding to the one of the torques and derives the one of the torques based on the read motor current.

20. The testing device of claim 19, wherein the controller based the respective voltage value of each of the motor Hall effect sensors determines whether the number of motor revolutions equals one degree of rotation of the control shaft for the damper based on the voltage value of the motor Hall effect sensors.

21. The testing device of claim 19, further comprising:

an angle counter, wherein when it is determined that the number of motor revolutions equals one degree of rotation of the control shaft, the controller stores a current value of the angle counter as the corresponding one of the plurality of pre-determined rotational positions in association with the derived one of the torques; and a damper end stop detector, wherein the controller reads a current value of the damper end stop detector, and wherein the testing device then determines whether the damper is fully open based on the current damper end stop value.

22. The testing device of claim 18, wherein, to characterize another one of the torques required to drive the damper to the corresponding one of the plurality of pre-determined rotational positions in the pre-determined reverse direction, the controller:

reads another number of motor revolutions from the motor revolution counter;

determines whether the other number of motor revolutions equals one degree of rotation of the control shaft for the damper; and when it is determined that the other number of motor revolutions equals one degree of rotation of the control shaft, reads a motor current corresponding to the other one of the torques and derives the other one of the torques based on the read motor current, wherein the testing device further comprising:

an angle counter, wherein when it is determined that the other number of motor revolutions equals one degree of rotation of the control shaft, the controller stores a current value of the angle counter as the corresponding one of the plurality of pre-determined rotational positions in association with the derived other one of the torques.

23. A method of characterizing a torque required vs. a rotational position of a damper with a testing device, the method comprising:

providing a controller including a processor and a memory for characterizing the damper in situ in a heating, ventilation and air conditioning (HVAC) system;

providing circuitry, wherein the testing device is configured to be mounted on a damper assembly having a control shaft and a damper rotatably coupled to the control shaft such that the control shaft is activated by the circuitry of the testing device; and providing computer-readable logic code stored in the memory which, when executed by the processor, causes the controller to:

open and close the damper by actuating the control shaft, detect a rotational position of the damper and a torque required to move the damper to the rotational position, characterize a plurality of torques required to drive the damper to a plurality of pre-determined rotational positions of the damper when subjected to a fluid flow to generate damper rotational position data vs. torque data, and store the damper rotational position data vs. torque data on a data storage device; and providing a damper manufacturing database and a look-up table including performance metrics, wherein the controller determines an optimal actuator having performance metrics that meet damper characteristics depicted by the damper rotational position data vs. torque data on the data storage device.

* * * * *